(12) United States Patent
Coleman

(10) Patent No.: US 8,489,511 B2
(45) Date of Patent: Jul. 16, 2013

(54) PRIVACY PROTECTION SYSTEM AND METHOD

(75) Inventor: Thomas E. Coleman, Stillwater, MN (US)

(73) Assignee: iPool Corporation, Roseville, MN (US)

( * ) Notice: Subject to any disclaimer, the term of this patent is extended or adjusted under 35 U.S.C. 154(b) by 136 days.

(21) Appl. No.: 12/941,792

(22) Filed: Nov. 8, 2010

(65) Prior Publication Data

US 2011/0055019 A1    Mar. 3, 2011

Related U.S. Application Data

(63) Continuation of application No. 11/821,840, filed on Jun. 26, 2007, now Pat. No. 7,835,990, which is a continuation of application No. 10/705,732, filed on Nov. 10, 2003, now abandoned, which is a continuation of application No. PCT/US02/14715, filed on May 8, 2002.

(60) Provisional application No. 60/289,567, filed on May 8, 2001, provisional application No. 60/356,989, filed on Feb. 13, 2002.

(51) Int. Cl.
*G06F 21/00* (2006.01)

(52) U.S. Cl.
USPC ................................ 705/54; 705/51; 726/26

(58) Field of Classification Search
None
See application file for complete search history.

(56) References Cited

U.S. PATENT DOCUMENTS

| | | | |
|---|---|---|---|
| 5,855,008 A | | 12/1998 | Goldhaber et al. |
| 5,987,440 A | | 11/1999 | O'Neil et al. |
| 6,009,410 A | * | 12/1999 | LeMole et al. ............. 705/14.54 |
| 6,253,203 B1 | | 6/2001 | O'Flaherty et al. |
| 6,434,621 B1 | * | 8/2002 | Pezzillo et al. ............... 709/231 |
| 6,460,036 B1 | | 10/2002 | Herz |
| 7,610,597 B1 | * | 10/2009 | Johnson et al. ................. 725/32 |
| 7,630,986 B1 | * | 12/2009 | Herz et al. ............................ 1/1 |
| 7,835,990 B2 | | 11/2010 | Coleman |
| 2002/0010621 A1 | * | 1/2002 | Bell et al. ......................... 705/10 |
| 2002/0174073 A1 | * | 11/2002 | Nordman et al. ............... 705/64 |
| 2008/0010206 A1 | | 1/2008 | Coleman |

OTHER PUBLICATIONS iPool.com Website, Mar. 2, 2000. Retrieved from the Internet via Archive.org: <http://web.archive.org/web/20000302014650/http://www.ipool.com/>.*
U.S. App. No. 11/821,840 Non Final Office Action Mailed Oct. 5, 2009, 16.
U.S. Appl. No. 11/821,840, Response filed Feb. 17, 2008 to Final Office Action mailed Oct. 16, 2008, 7 pages.

(Continued)

*Primary Examiner* — Jamie Kucab
(74) *Attorney, Agent, or Firm* — Schwegman Lundberg & Woessner, P.A.

(57) ABSTRACT

A method and system for asserting control over and protecting the privacy of individuals' personal and transactional information, to prevent unauthorized use thereof, and permit limited use thereof, with compensation, to the extent permitted the individual. Privacy notices are given in printed and electronic form to other parties involved in the individuals' transactions. The individuals' own data are collected and maintained in a privacy trust database. On a voluntary basis, abstracted, anonymous profile information can be made available to advertisers, in exchange for compensation to the individuals. One use is in a content broadcasting system, where receipt of profile based viewer-specific commercial messages provide financial compensation for the cost of user-selected content received by the individual.

14 Claims, 12 Drawing Sheets

OTHER PUBLICATIONS

U.S. Appl. No. 11/821,840 Notice of Allowance mailed Jul. 13, 2010, 12 pgs.

U.S. Appl. No. 11/821,840, Response filed Mar. 31, 2010 to Non Final Office Action mailed Oct. 5, 2009, 13 pgs.

U.S. Appl. No. 11/821,840 Final Office Action mailed Oct. 16, 2008, FOAR, 8pgs.

International Application Serial No. PCT/US02/14715, Response to Written Opinion filed Jul. 7, 2003, 5 pgs.

International Application Serial No. PCT/US02/14715, Search Report mailed Sep. 17, 2002, 6 pgs.

International Application Serial No. PCT/US02/14715, Written Opinion mailed May 5, 2003, 6 pgs.

U.S. Appl. No. 10/705,732, Examiner Interview Summary mailed Oct. 17, 2007, 2 pgs.

U.S. Appl. No. 10/705,732, Non Final Office Action mailed Dec. 26, 2005, 5 pgs.

U.S. Appl. No. 11/821,840, Advisory Action mailed Mar. 6, 2009, 3 pgs.

U.S. Appl. No. 11/821,840, Examiner Interview Summary filed Jun. 30, 2010, 1 pg.

U.S. Appl. No. 11/821,840, Response filed Jun. 24, 2009 to Restriction Requirement mailed May 26, 2009, 6 pgs.

U.S. Appl. No. 11/821,840, Restriction Requirement mailed May 26, 2009, 6 pgs.

"Letter, Tom Coleman to Jane Bryant Quinn", (Jun. 5, 2001), 1 pg.

"Letter, Tom Coleman to Jane Bryant Quinn", (May 22, 2001), 4 pgs.

"Letter, Tom Coleman to William Safire", (Jun. 5, 2001), 1 pg.

"Letter, Tom Coleman to William Safire", (May 22, 2001), 4 pgs.

"Wayback Archive, iPool", Internet Archive Wayback Machine (http://ipool.com) 1999 (http://wayback.archive.org/web/19990101000000*/http:////ipool.com; http://web.archive.org/web/19991013133133/http://ipool.com/; http://web.archive.org/web/19991105055128/http://ipool.com/), accessed Dec. 6, 2011, (1999), 4 pgs.

"Wayback Archive, iPool", Internet Archive Wayback Machine (http://ipool.com) 2000 (http://wayback.archive.org/web/20000715000000*/http://ipool.com; http://web.archive.org/web/20000510041025/http://www.ipool.com/; http://web.archive.org/web/20000605072253/http://www.ipool.com/;, http://web.archive.org/web/20000607012006/http://ipool.com/; http://web.archive.org/web/20000706193433/http://www.ipool.com/; http://web.archive.org/web/20000815225950/http://www.ipool.com/), accessed Dec. 6, 2011, (2000), 7 pgs.

"Wayback Archive, iPool", Internet Archive Wayback Machine (http://ipool.com) 2001 (http://wayback.archive.org/web/20010401000000*/http://ipool.com; http://web.archive.org/web/20011105202801fw_/http://www.ipool.com/glbl/home.php), accessed Dec. 6, 2011, (2001), 2 pgs.

Coleman, Thomas E., "It's Mine, Not Yours!: Take Back Your Personal Information and Privacy", Published by iPool Corporation, (2001), 57 pgs.

Coleman, Tom, "iPool Website Launch", (May 18, 2001), 8 pgs.

Ewoldt, J., et al., "Savings club members can save on services", Metro Edition, Shopping Bag, Accessed at http://search.proquest.com/docview/426960909?accountid=39072, (Apr. 30, 1998), 3 pgs.

Wieffering, E., et al., "iPool helps consumers join forces for buying", Minneapolis Star Tribune, Retrieved from http://search.proquest.com/docview/427186852?accountid=39072, (Nov. 21, 1999), p. 01D (4 pgs.).

\* cited by examiner

PRIVACY PROTECTION SYSTEM AND METHOD

RELATED APPLICATIONS

This application is a continuation under 37 C.F.R. 1.53(b) of U.S. application Ser. No. 11/821,840, filed Jun. 26, 2007, which is a continuation of U.S. application Ser. No. 10/705,732, filed Nov. 10, 2003, which is a continuation under 35 U.S.C. 111(a) of International Application Serial No. PCT/US02/14715, filed May 8, 2002 and published in English as WO 02/091186 A1 on Nov. 14, 2002, which claims priority from U.S. Provisional Application Ser. No. 60/289,567 filed May 8, 2001 and U.S. Provisional Application Ser. No. 60/356,989 filed Feb. 13, 2002, which applications and publication are incorporated herein by reference in their entirety.

FIELD OF THE INVENTION

This invention pertains generally to the field of protection of individual privacy, and in particular, to the protection of individuals' rights to privacy, ownership and control of personal information and communications. The invention also pertains to the use of the privacy system to support content broadcasting to participating individuals based on viewer-specific commercial messages while protecting the individual's privacy.

BACKGROUND OF THE INVENTION

Privacy is considered a fundamental right of democracy and has been so interpreted in U.S. Supreme Court decisions. Individual privacy is defined as a human right by the United Nations. However, in the information age, personal privacy is being invaded and personal information is being misappropriated at an alarming rate. Information gatherers are reaching into families, homes and businesses taking whatever information they can, including individuals' credit files, transactions, and Internet activities. The attitude of the information gatherers is that collecting by any means is their business and they have nothing to apologize for to the individuals whose information they have taken. This information is then bought and sold, and used against the wishes and interests of the individuals from whom it was taken. The long-feared intrusive presence of "big brother" has arrived, but it turns out to be business "big brother" rather than government "big brother" who is pushing aside individuals' rights.

In the twelve months following Apr. 1, 2000, more than 1,000 major media articles have been written about the invasion of consumer privacy. The articles have well documented privacy abuses by banks, websites, credit-reporting agencies, web advertising agencies, data mining companies, on-line pharmacies, mortgage companies, grocery stores, Internet service providers, and the tracking and selling of Internet activities of school children, just to name a few. There have been class action lawsuits over privacy. The Federal Trade Commission has investigated Internet companies for privacy issues and credit-reporting agencies that have sold the confidential financial information of consumers. In 2001, there have been more than 50 major pieces of privacy legislation proposed at the state and federal level.

Despite the media attention and increasing public outcry, there is little protection of personal information. The existing state and federal laws are a thin patchwork which apply to specific instances and types of information, but which fall short of consistent or comprehensive protection of individuals' privacy. Consumer privacy laws have been frequently introduced at both the state and federal levels in the United States, but nearly all were stalled or killed by lobbyists. To confuse the public and disguise their intent, companies that gather, compile, and sell personal information have formed numerous trade associations that package themselves as "privacy organizations." Yet, these are often the same companies that have blocked privacy legislation initiatives in Congress and state legislatures. The result is that laws which have been passed are often more favorable to privacy intrusion than to privacy protection.

For example, within the financial services industry, banks, insurers, credit card companies, and securities firms, are mandated by the Gramm-Leach-Bliley Act (GLBA) to have a "privacy policy." The privacy policy states how a company collects and uses your personal information. Under GLBA, financial services companies can collect, share, and sell all of the personal information they collect about their customers to nearly anyone or any company they define as an "affiliate" or within their "family" of companies. A family company is a subsidiary company or company linked to the parent company, such as an insurance company or brokerage firm. An "affiliate" can be a telemarketer, junk mailer or other companies seeking to sell products or services to the customers of the financial services company.

The information that the financial services company can share or sell under GLBA includes all financial information that bank customers gave the bank and all purchase information the bank has collected about them. This includes Social Security numbers, check and credit card transaction information, and accounts and transactions the bank customers have with other companies.

The GLBA law requires financial services companies to have a privacy policy that allows the consumer to "opt-out" of the sharing and selling of their personal information. However, if a customer uses the company-supplied opt-out form, GLBA allows financial service companies to "share" all of the customer's "non-public" information with other divisions, groups or subsidiaries of the parent company. This means that even if the customer chooses to opt-out, he or she can't opt-out.

Moreover, under GLBA, companies have the right to change their privacy policies at will. Some require consumers to send "opt-out" notices every year, or they are automatically re-enrolled in their programs that share and sell their data to others including telemarketers and direct mail companies.

Banks have acquired or merged with insurance companies and brokerage houses to cross-sell products from one company to another's customer base. In order to cross-sell products, they needed to share customers' personal financial information within their family of companies. GLBA was passed to allow them to do that.

The writing of corporate privacy policies and opt-out agreements has become a near art form for corporate lawyers. The art is in drafting a privacy policy that gives the consumer the illusion of privacy protection and the ability to opt-out, but in reality does not. In fact, the whole objective of privacy policy writing is to do everything possible to insure that the consumer does not opt-out.

There are four types of privacy; informational privacy, privacy of communication, physical privacy, and physical space privacy. Informational privacy is the right to control one's private and personal information, which includes medical, financial, demographic, Internet activities, and other information that could be defined as personal. Privacy of communication is the right to conduct secure and private communications using the U.S. mail, e-mail, telephone, fax, or any other form of communications medium. Physical privacy is the right to protect yourself from another person physically touching you in a harmful or invasive manner. Physical space privacy is the right to define limits of intrusion into one's home, office space, and other areas where you may be located.

This invention is directed to protection of informational and communications privacy. Goals of informational and communications privacy include the rights of individuals:

to own their personal information, which includes financial, demographic, medical information, information about their Internet activities and actions to control the access and use of their personal information by others to prevent telemarketers, direct mailers, and other companies or individuals from contacting them without explicit permission to choose who is allowed to know information about the individual, and the extent and terms for use of such information including compensation to the individual to prevent identity theft, by closing down availability of personal information to unauthorized persons.

Much of the aggressive personal information gathering which is taking place is driven by the commercial interest in profiling individuals. The more that business knows about an individual's demographics, finances, and purchasing habits, as detailed in their profile, the more valuable the profile becomes. It has been estimated that the average profile is worth about $800 per household, per year, depending on the economics of the household. This number will increase to between $1,500 and $3,000 as technology allows more commercial messages to be directed at specific consumers (one-to-one marketing). The more information a company has compiled on a person, the greater is its ability to send specific messages to the person's household (target one-to-one marketing).

Most persons would be shocked to learn how much information businesses are collecting, buying and selling about them. This currently includes information about what websites an individual visits from their own home computer, which pages they see, and even how long each one is viewed. Companies also have access to records on the individual's finances, including stock holdings, and all personal check and credit card transactions. The temptation and financial inducement are great for those companies to sell all this information to profilers, as witnessed by recent news stories of major banks selling account holders' information to telemarketers. Banks, credit-reporting agencies, merchants, credit card companies, Internet companies, telecommunications companies, cable providers, and nearly everyone consumers do business with, are collecting, compiling, using, and selling personal information. Even a trip to the supermarket, if paid for by check or credit card, results in information being collected about specific foods and personal care items being purchased by the specific individual.

Faced with the current situation of legislative stalemate and electronic data-collection anarchy, individuals may feel there is little they can do against such pervasive, well-financed and well-connected information gathering businesses. Part of the problem is that individuals have been slow to realize how pervasive data collection has become and how bold the gatherers have become in their use of it. By and large, individuals have failed to assert ownership rights over their personal information, and as a result, companies have simply taken it as their own. The irony of the situation is that the companies claim that individuals do not own their own information, but as soon as the companies have collected it, the companies claim that they own it.

However, using the methodologies and technologies described herein, individuals can group together and collectively assert and protect their privacy rights. At some time in the future, consumers may be able to act individually.

Companies rely on consumer complacency not to act in order to continue sharing and selling personal information. If a consumer does act to assert his or her privacy rights, the companies expect the consumer to act alone and under terms the company has defined. Such a consumer has little power to enforce his or her rights.

The balance of power quickly shifts, however, when consumers act together to impose their will upon corporations. Determination and the grouping together of large numbers of individuals have always had the power to change policies of governments and corporations. A pooled personal data rights organization can be used to assist individuals in asserting their privacy rights, and in enforcement actions, if necessary, against companies which continue to abuse privacy rights. In this scenario, it is the consumers who hold the power. Companies will have to decide whether they want the individuals as customers under privacy terms defined by their customers, or face the prospect of losing substantial numbers of customers.

SUMMARY OF THE INVENTION

As explained in detail below, this invention provides a method and system for managing and protecting individuals' privacy in transactions.

As used herein, "transaction(s)" includes any action or situation wherein an individual's identity or any information about the individual is discernable. This includes, but is not limited to, commercial transactions, purchases, rentals, trials, returns, warranty registrations, claims, inquiries, browsing, e-mailing, applying for or checking on any type of account, membership, or request for information, and any type of action or situation involving demographic, financial, medical, or other personal information.

According to one aspect of the invention, individuals may assert property rights over their personal information and communicate such to all companies on whom they choose to serve the notice to opt-out, and to cease and desist from the collection, compilation, sharing, and selling of personal information.

According to one aspect of this invention, consumers could serve a form of public notice asserting ownership rights over their data and automatically blanket serve notice on all potential holders, acquirers, and users of their personal information that they, the consumer now have ownership rights over all of their personal information.

According to one aspect of the invention, companies may first have to submit names of individuals to the pooled data rights organization before in any manner acquiring, using, selling, sharing, scoring, or modifying the consumer's personal information.

According to one aspect of the invention, individuals may opt-out of all information sharing and selling by their insurance company, bank, credit card company, mortgage company and any other financial service company with whom the individual does business. This is preferably done by a clear and unambiguous statement, and not by using forms provided by the financial institution. This may also be done via a public notice and no individual notice to companies.

Such notice may also include direction to remove the individual's name and information from all direct marketers' lists including telemarketers, junk e-mailers and others; notice to household service providers to stop collecting, sharing, and selling the individual's information; and notice to all merchants, check processors, credit-reporting agencies and others from taking personal information off of checks.

According to one aspect of the invention, these notice steps are preferably done through a pooled personal data rights organization which has the advantage of representing the combined power of a large number of subscribing individuals. The pooled personal data rights organization is designed to accomplish all of the above steps on behalf of individuals who choose to join as members. The iPool.com website is designed to perform the functions of the pooled personal data rights organization, and for convenience the description in this patent application will use "the iPool website" (or subsequent website) or simply "iPool" to designate this organization and function.

According to one aspect of the invention, a member can enter his or her personal identification once and it is automatically entered into the iPool notices to be sent to businesses, which the user can select at the iPool website, advising them that the identified individual has asserted ownership and imposed restrictions on the use of his or her information in transactions. There are separate notices for financial, non-financial service and direct marketing companies.

Financial service companies receive iPool notices that state the individual's ownership right over his/her personal information and serve notice to opt-out of the sharing and selling of personal information.

Providers of non-financial household services such as cable and telecommunications providers, receive iPool notices that state the individual's ownership right over personal information and serve notice to stop the collection, compiling and selling of personal information.

Direct marketing companies such as junk mailers and telemarketers receive notices that state the individuals ownership right over his/her personal information and notice to remove the individual's name and personal information from their databases and lists.

The iPool notices will be sent to the senior management of each of the respective companies, and may be sent to government agencies.

According to another aspect of the invention, members can order special iPool personal checks which are imprinted with a restrictive endorsement, such as the following:

"All endorsers and transferees agree, by accepting this instrument not to use any information obtained about the drawer from this instrument in any manner whatsoever and acknowledge the personal nature of such Information and its ownership by the drawer. © Copyright. 2001, iPool Corporation all rights reserved"

These checks make it clear that the transaction for which the payment is being made by check is solely for the purpose of selling the goods or services (the primary purpose), and that the receiving party (i.e., the merchant or vendor) and all parties who process or have access to the check, are prohibited from taking personal information off the check or otherwise from the transaction for which the check was issued.

According to another aspect of the invention, members can use similar notices for protecting their personal and transactional information in credit card, debit card, electronic fund transfer systems such as "PayPal" transactions. The notice may be printed on the card, or embedded in the magnetic stripe or other machine-readable data on the card, such that the merchant or other entity taking a read or "swipe" of the card will receive the restrictive notice. Alternatively, a code may be inserted in the magnetic stripe or other machine-readable data on the card, such that the point-of-sale terminal will print out the notice on the printed-out receipt for the credit which is to be signed by the cardholder. Alternatively, arrangements may be made through a particular credit card issuer, who would then impose obligations on all their retailers to respect the privacy of the consumer's personal and transactional data. The credit card issuer or other entity may seek to license such technology for all of its current and future customers.

According to another aspect of the invention, members can use privacy notice codes in conjunction with their web browsers for giving electronic notice to websites for protecting their personal and transactional information in Internet activities. This notice may be in the "http header" or in the "cookie" file of the member's web browser. iPool will have sent notice by mail, electronic and other means to websites, on-line advertisers, companies that monitor on-line activities, and other collectors of on-line data that when they read the privacy notice in the cookie of a computer user, that user is asserting ownership of personal transactional data specifically including the current Internet activity and the user's history of all browsing and other Internet activities. Such notice makes it clear that the user does not consent to any use of his/her information, and in fact specifically prohibits it.

According to another aspect of the invention, a member may assert copyright ownership in the record of his/her Internet activities which they create as they travel the Internet. This may be done with a web tracker program in the member's web browser, which will log all sites and activities, and download it to the member's own account in the storage area of a trust organization. There the owner can have complete control over the information, and decide what whether to allow any use to be made of it, and under what terms the use will be.

According to another aspect of the invention, a member may choose to allow the use of profiled personal information, on an abstracted basis in which individual identity is not disclosed, to allow advertisers to send targeted commercial messages to the viewer as a means of providing financial support or subscription payment for the receipt of broadcast content which the viewer wishes to receive. The consumer may also chooses under certain conditions including compensation and other benefits, to allow their identity to be disclosed for a single or multiple transactions.

PRIVACY PROTECTION

Figure 1:
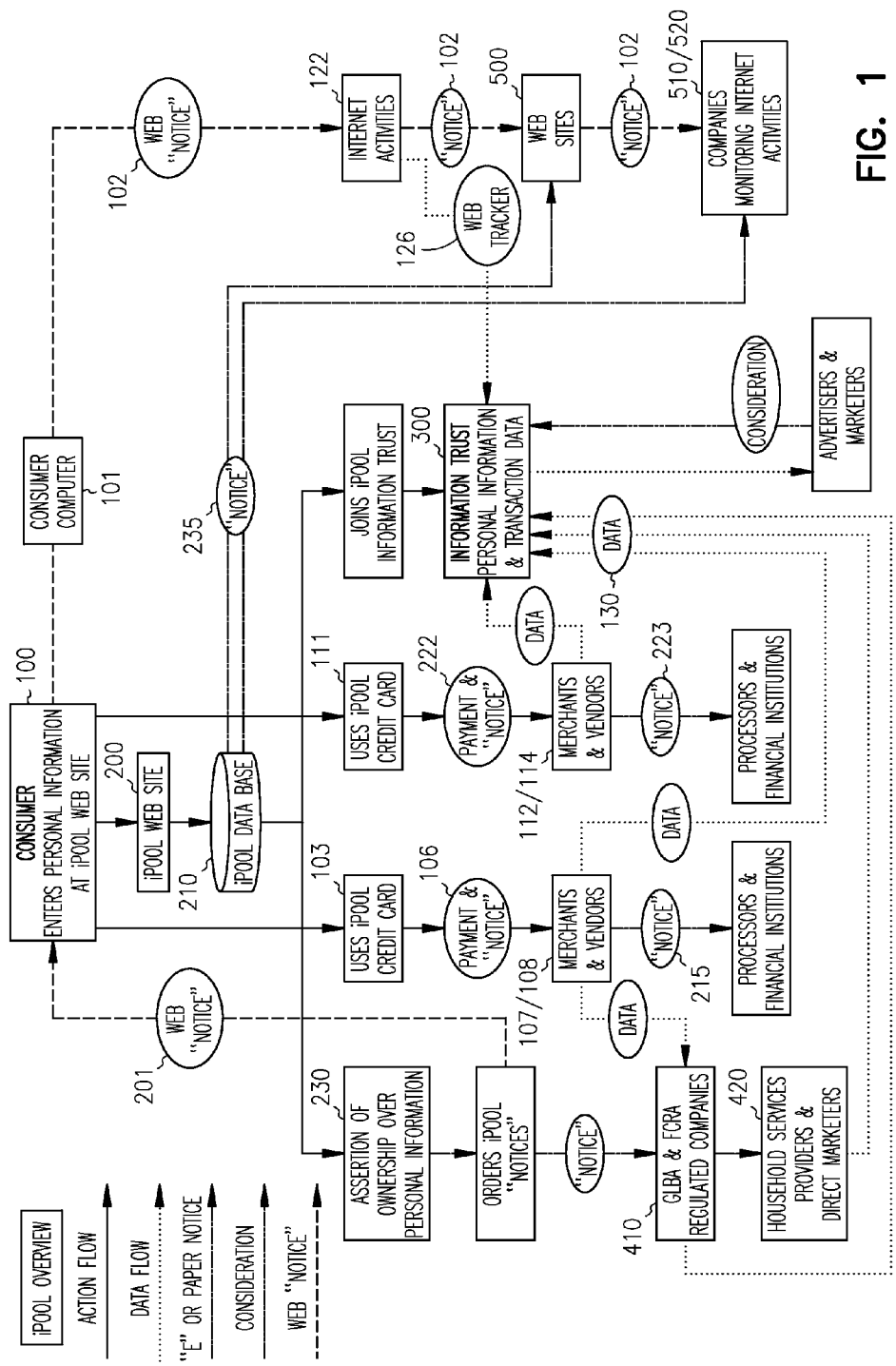
FIG. 1 is a block diagram illustrating the overall system and method of operation of the invention.

According to one aspect of the invention, a consumer, identified by reference number 100 in the drawings, may assert ownership and manage control of his/her personal and transactional information rights through the use of a pooled personal data rights organization, for example, the organization accessible at iPool's website at www.iPool.com (or subsequent website). In time, individuals may personal manage their identity. This includes iPool website 200, iPool database 210, and other systems, subsystems and actions as are generally designated by 200 series reference numbers in the drawings herein. A consumer 100 may communicate with iPool through the iPool website 200 which is reached through an Internet connection from the consumer's computer. The consumer's computer is shown at reference number 101 for use in various Internet activities as described below, and it will be understood that the consumer's computer would usually be used for connection to the iPool Website also. A consumer may join iPool at website 200. Alternatively, it is possible to join as a member through mail or telephone as is generally known. However, the Internet connection is preferred and facilitates connection through many of the services described herein. As part of the membership, a consumer provides personal information to the iPool website. This is needed so as to properly identify the consumer when notices are provided to financial, commercial and Internet sites. The consumer's information as a member of iPool is stored in the iPool database 210.

One of the functions that the consumer may do through iPool is to provide notice to various entities that the consumer is asserting ownership right over his/her personal and transactional information. The beginning of this process is indicated at block 230. Upon instruction by the consumer at step 230, iPool can assist in sending notices of ownership to various organizations. This can be done by emails or other electronic documents including the use of electronic signatures as contemplated by the Uniform Computer Information Transactions Act or other laws.

At step 231, iPool sends out the various notices. For convenience, the iPool database 210 may include a section previously loaded with identification numbers and contact information for numerous companies providing financial, household or other services, as well as direct marketers and the like. Then, for convenience, the consumer can simply check the intended companies from the list. Alternatively, for companies not on the list, the consumer can provide complete contact and name information to the iPool website. Alternatively, if the consumer has given a public notice, companies may want to or be legally or liability bound to first submit names to the pool rights organization to determine if any of the consumers of the submitted lists have publicly asserted ownership rights over their personal information.

Based upon the consumer's instructions, iPool at step 231, sends notices 232-235 to various organizations on behalf of the consumer. The exact form which the notice takes may vary, depending upon the organization being contacted. However, all such notices notify the recipient that the individual consumer is asserting ownership rights over personal information, instructs them to opt out and remove them from all lists, and instructs them that they are prohibited from compiling, selling, transferring or otherwise using the consumer's personal information.

Figure 2:
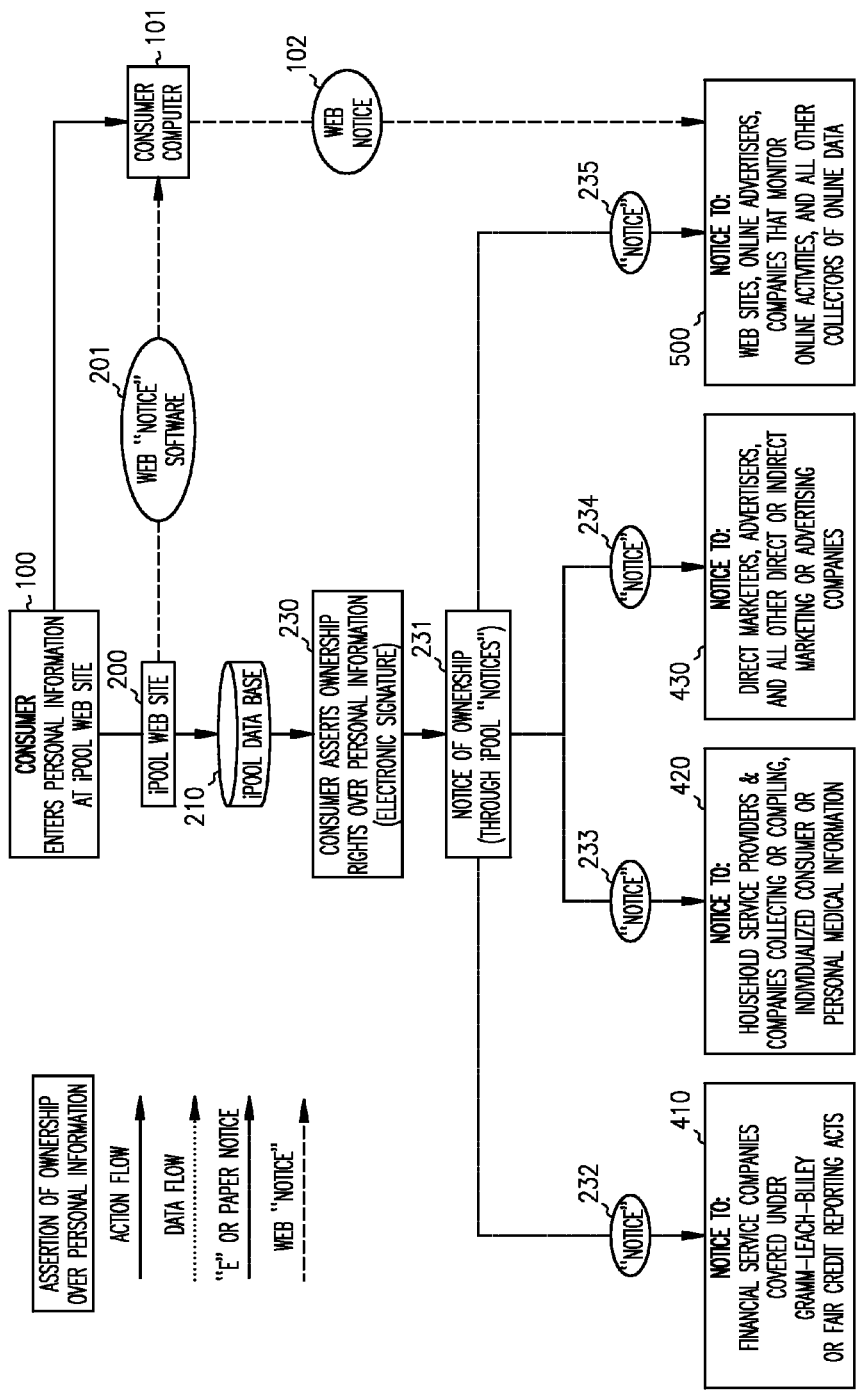
FIG. 2 is a block diagram of a portion of the system of FIG. 1 showing the assertion of ownership over personal and transactional information.
Figure 3:
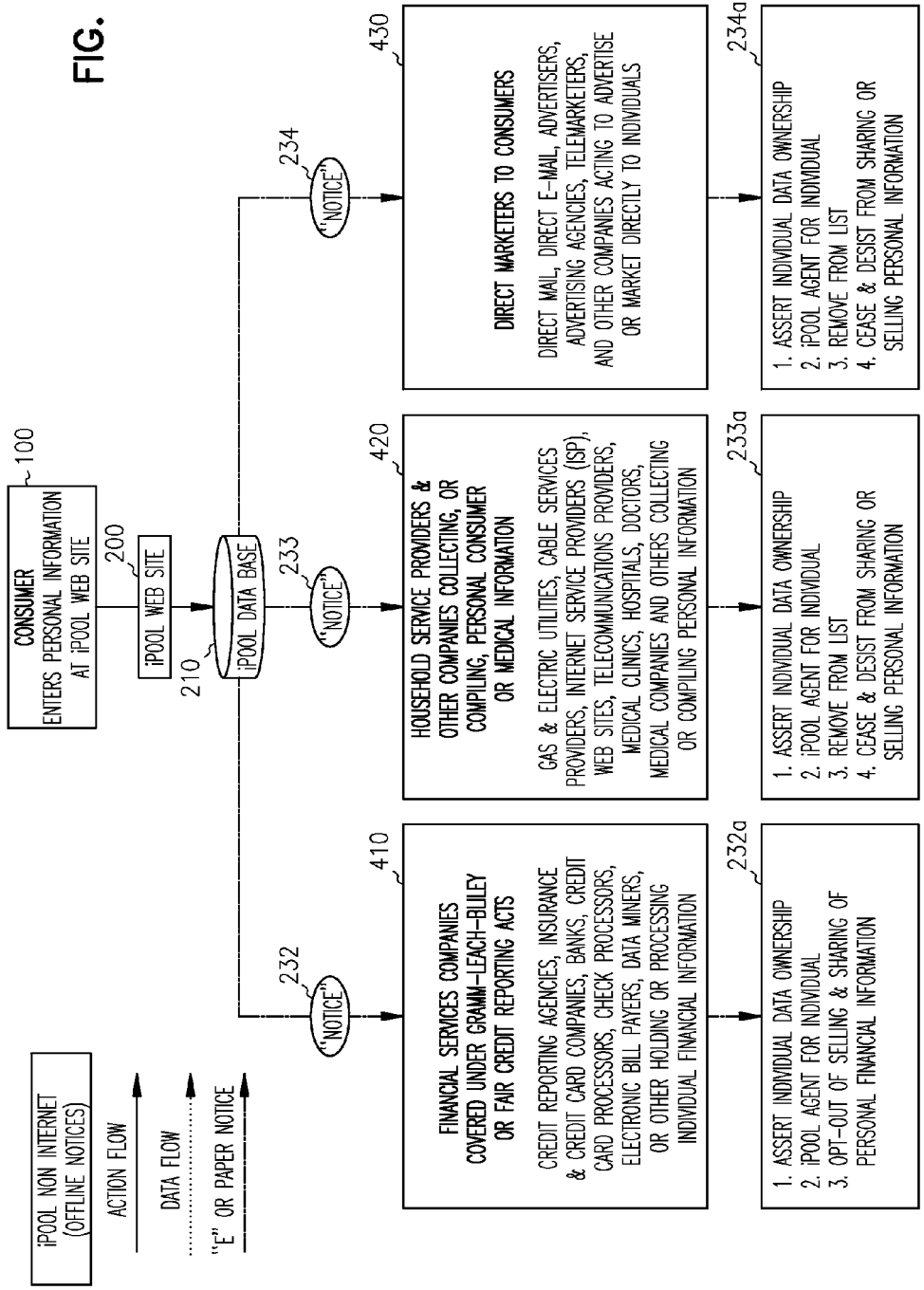
FIG. 3 is a block diagram of a portion of the system of FIG. 1 showing the notice and assertion of ownership of personal and transactional information to various financial and commercial entities.

As shown in FIGS. 2 and 3, notice 232 is sent to financial institutions as indicated at block 410. This includes financial service companies who are covered under the Gramm-Leach-Bliley or Fair Credit Reporting Acts. This notice is tailored to invoke the notice provisions of that Act and to unequivocally opt the consumer out of any uses of his/her data. As summarized at block 232a (FIG. 3), the notice specifically (1) asserts individual data ownership, (2) notifies them that iPool is the agent for the individual, and (3) opts out of selling and sharing of personal financial information.

Notice 233 may be provided to household service providers and companies collecting or compiling individualized consumer or personal medical information as indicated at block 420. As shown in greater detail in block 233a (FIG. 3), such notice (1) asserts individual data ownership, (2) notifies them that iPool is the agent for the individual, (3) instructs them to remove the individual from all of their lists, and (4) orders them to cease and desist from sharing or selling personal information. Alternatively, if the consumer has given a public notice, companies may want to or be legally or liability bound to first submit names to the pool rights organization to determine if any of the consumers of the submitted lists have publicly asserted ownership rights over their personal information.

Notice 234, which may be the same or similar form as notice 233, may be provided to direct marketers, advertisers and all other direct or indirect marketing or advertising companies as indicated in block 430. iPool has a list of such companies based upon past activities and knowledge of the marketplace. When any or all of such marketers and advertisers may at one time or another try to collect or transfer information on a particular consumer, notice of the type referred to in block 234a (FIG. 3) for each consumer member of iPool would typically be sent to all such entities in block 430. In addition, if the consumer is aware of additional such entities, they can be added for notice purposes. Such notice (1) asserts individual data ownership, (2) notifies that iPool is the agent for or acting on behalf of the individual, (3) instructs them to remove the consumer from their lists, and (4)instructs them to cease and desist from direct marketing to the consumer.

Figure 4:
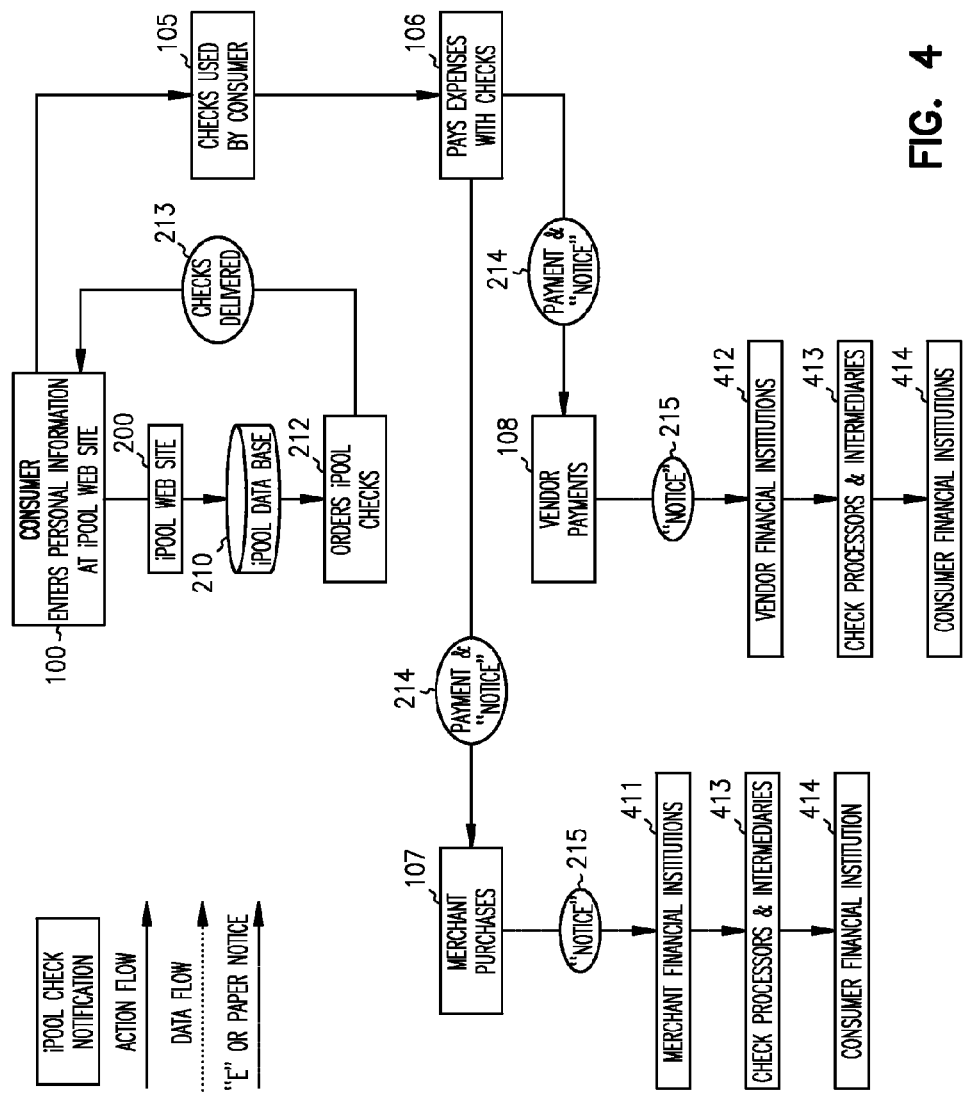
FIG. 4 is a block diagram of a portion of the system of FIG. 1 showing the notice and assertion of ownership of personal and transactional information in checking transactions.
Figure 6:
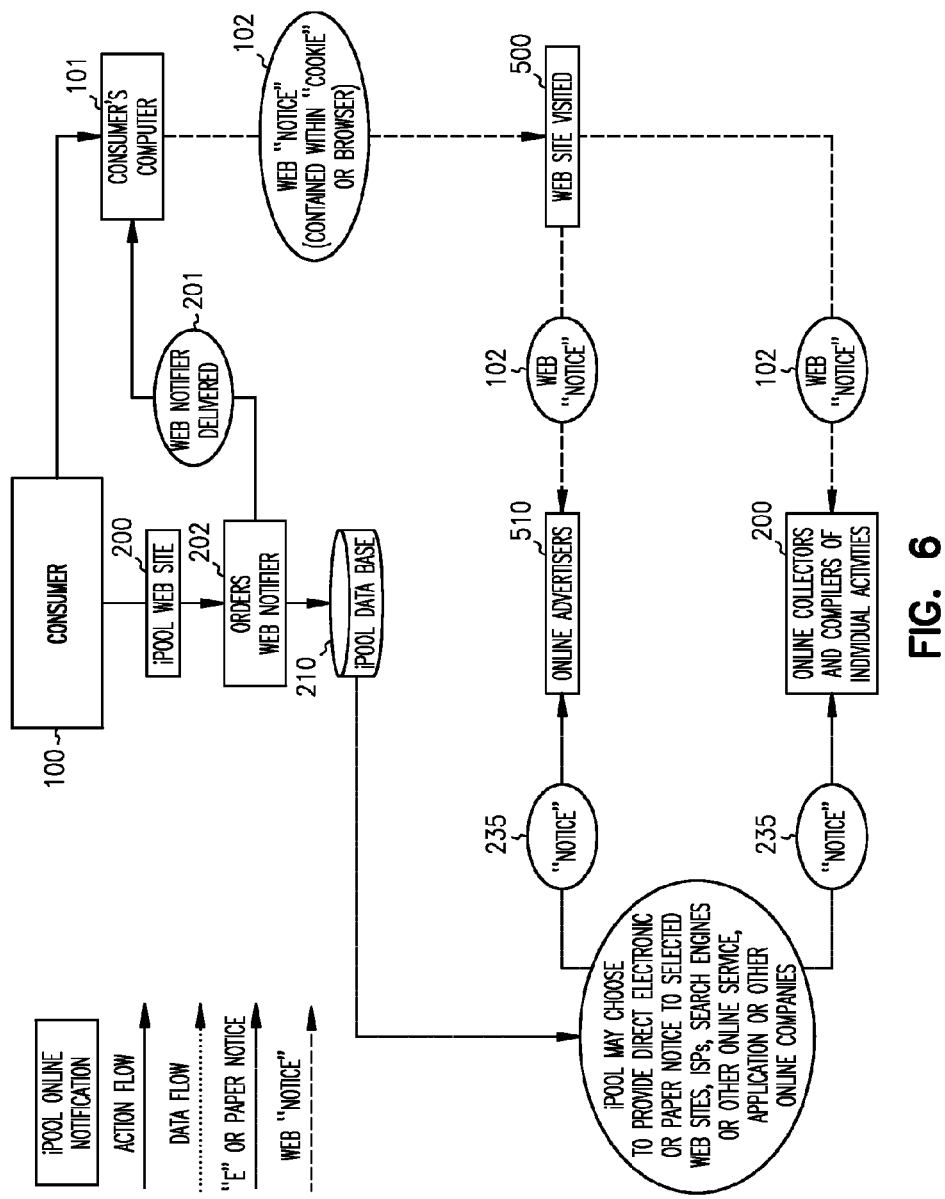
FIG. 6 is a block diagram of a portion of the system of FIG. 1 showing the notice and assertion of ownership of personal and transactional information web browsing and other web transactions.

As shown in FIGS. 2 and 6, notice is also given to web-type activity companies including websites, on-line advertisers, companies that monitor on-line activities and all other collectors of on-line data, referred to generally in block 500. The identity of the entities in block 500 is maintained in an area of the iPool database 210, based upon the monitoring of activities and knowledge of the advertising and on-line community's activities. The on-line entities in block 500 are given notices in two forms: the notice 235, which is typically sent electronically or by mail, and the web notice 102. The consumer 100 may request the web notice software 201 from the iPool website 200. The web notice software 201 causes installation of the web notice 102 in the form of a special legend or code which may be in the "http header" or the "cookie" file, or both, of the member's computer web browser. For example, the legend could include the phrase "iPool Privacy" or any other code or phrase, of which the entities in block 500 will be notified. The notice 235, which is typically sent electronically, by mail, by fax or any other means, informs a receiving entity in block 500 not only of the assertion of ownership rights over personal information by the consumer, but also specifically that the consumer asserting his/her own rights will be identified by having the special web notice 102 in his/her browser. Notice 235 informs such entities that when they see the special code, web notice 102 in the "http header" or the "cookie" file of a person's browser, this person has asserted ownership over personal information, including Internet browsing history (discussed in greater detail below) and that the 500 entity is specifically prohibited from collecting or otherwise making use of the consumer's information. The protection of consumer information in a checking transaction is shown in greater detail in FIG. 4. At step 212 the consumer/member orders special iPool checks, and iPool delivers them to the consumer/member at step 213. These checks, which include the usual bank and account number information for the consumer, in addition include a notice and a restrictive endorsement on the back of the check. The consumer/member of iPool then uses the checks at step 105 in the payment of expenses for merchant or other vendor transactions, step 106. The consumer may make a merchant purchase 107, with payment indicated at step 214 using the checks containing the notice on the check. Part of this notice is a restrictive endorsement, the acceptance of which by the merchant indicates their agreement to the restriction on the use of the customer's personal and transactional data: specifically, that the transaction and the payment therefor is solely for the purposes of the purchase of the goods or services, and that the merchant and all holders in due course are prohibited from using the consumer's personal information, or information specific to the transaction for which the check was given in payment, for any other purpose. This notice 215 goes with the check as it makes its way through financial clearing houses, including the merchant's bank or other financial institution 411, any check processors or other intermediaries 413, and finally to the consumer's own bank or financial institution 414. In addition, iPool may send notices directly to the entities in blocks 411, 413 and 414 to further alert them to the restrictions on use of the consumer's information.

A similar path is followed for other vendor payments 108, where the restrictive endorsement and notice on the checks is passed at step 214 to the vendor, and at step 215 to all other financial processors and intermediaries 412-414.

Figure 5:
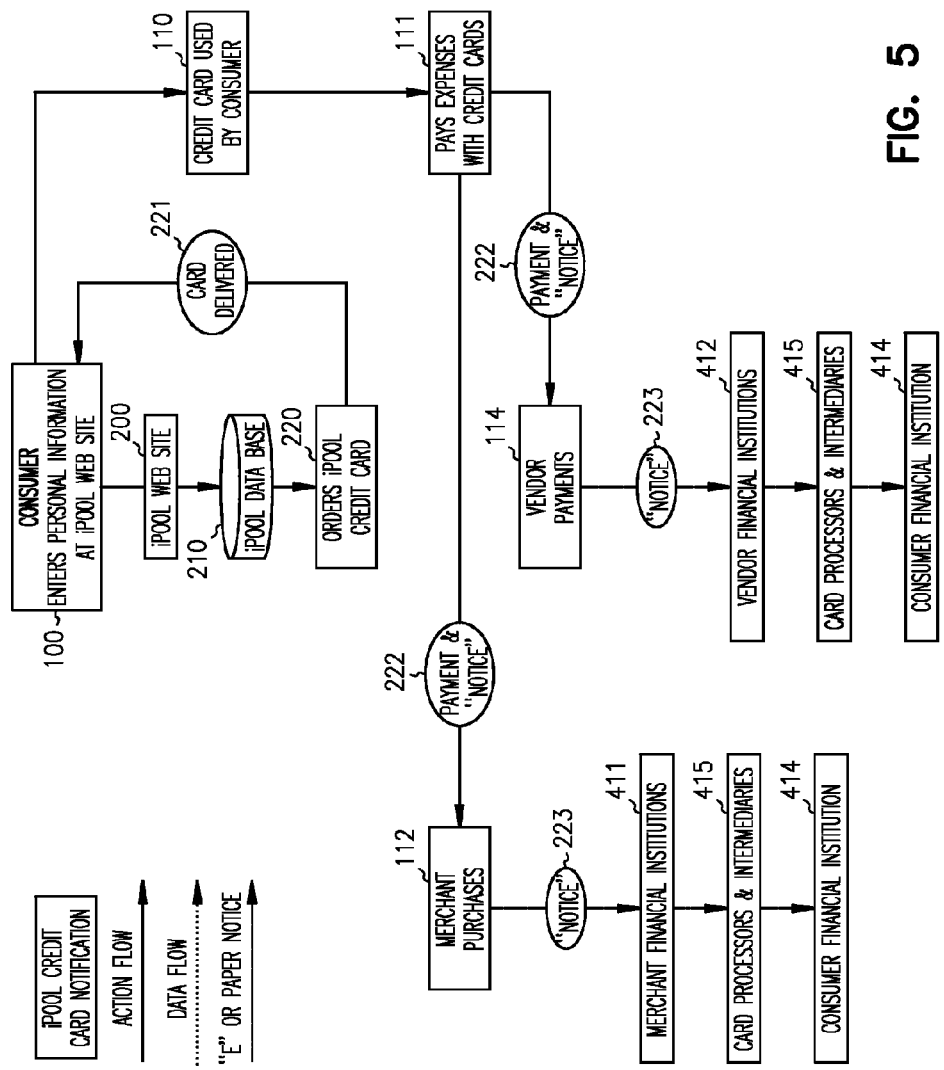
FIG. 5 is a block diagram of a portion of the system of FIG. 1 showing the notice and assertion of ownership of personal and transactional information in credit card transactions.

Protection of consumer information in credit card transactions is illustrated in FIG. 5. The consumer/member of iPool 100 may request iPool to issue a special credit card at step 220. Following credit card establishment procedures, iPool and/or a participating credit card company may issue and deliver a card 221 to the consumer. The credit card and its account have special features which facilitate providing notice 222 to merchants 112 and vendors 114 when the consumer uses the credit card at step 110 for payment for a transaction, step 111. The notice is given both to merchants in connection with purchases 112, and to other vendors in connection with credit card payments 114. In addition, the notice 223 is conveyed on to merchant or vendor financial institutions 411/412, all credit card processors and intermediaries 415, and finally to the consumer's bank or other financial institution 414. The notice is that the consumer is asserting ownership over personal information and transactional information, and that neither of these shall be used for any purpose other than the immediate purchase of goods or services associated with the transaction, and specifically that no one is authorized to compile, transfer, sell or otherwise use any of the transactional or personal information associated with the consumer.

For credit cards, the notice can take any of the following forms including combinations thereof. The notice legend can be printed on the back side of the credit card. The notice legend can be encoded in the magnetic stripe or other machine-readable identification, such as a bar code, on the card, such that the notice will be read when a credit card is "swiped" or otherwise read during a credit card transaction. The credit card magnetic stripe may have a code for the notice rather than the complete notice itself. The point-of-sale transaction receipt printer can be programmed to read this special code and to print the notice legend on the credit transaction documents. The account number for the consumer may have a code signifying that the notice restriction applies, or the credit card account itself may otherwise be designated as being subject to notice restrictions, such that when the point-of-sale device checks with a central credit-authorizing facility to look up the account and secure approval for the transaction, the restricted nature of the account will be found, causing the point-of-sale printer to print out the notice. Some of these steps require varying degrees of cooperation with a credit card company and/or a retailer. iPool may negotiate with a credit card company to put these features into place for iPool members, and the credit card company will then put these features into place with its agreements with retailers.

Consumers' interests in protecting their personal and transactional data in payments made through bill paying service companies can be protected in a manner similar to the check payment (FIG. 4) and credit card payment (FIG. 5) examples given above. Bill paying service companies issue payments on behalf of consumers, as a convenience to the consumer. Such companies receive instructions from consumers, typically on-line, and issue payments typically by electronic transfer to pay the consumers' bills, out of funds provided by the consumer or otherwise paid for by the consumer through arrangement with the bill paying service. At the consumer/member's request, iPool will provide notice to the bill payment company that the consumer is asserting ownership over personal information and transactional information, and that neither of these shall be used for any purpose other than the primary purpose of payment for bills associated with the consumer/member's transactions, and specifically that no one is authorized to compile, transfer, sell or otherwise use any of the transactional or personal information associated with the consumer. This notice can be sent electronically or by mail or otherwise to the bill paying companies. In addition, iPool can provide the member with an electronic form of notice to be given to the bill paying companies on-line when giving instructions to pay bills. All such notices requires the bill paying company to convey the notice on to the entity being paid on behalf of the consumer, and on to all clearing houses and financial institutions, as was the case also for payments by and credit card payments.

The nature and purpose of the notice sent to web entities in block 500 in FIG. 2 is described further with the help of FIG. 6. A consumer orders the web-notifier software at step 202, and iPool delivers it at step 201 to the consumer for installation on consumer's computer 101. At some time, iPool may choose to license this technology to other companies, and the web-notifier would be integrated directly into web browsers, search engines, and other software. Specifically, the web notice 102 takes the form of a special code or indicia associated with the browser. As the consumer/member of iPool travels or "surfs" throughout different website addresses and locations on the Internet, the consumer's notice 102 is available for reading and, in fact will be read, by most websites 500 that are visited. When a person visits a website, the person's browser sends an http header, which tells the website information such as the identity of the person's Internet Service Provider, and the type of browser they are using. One form for the iPool notice 102 is in the http header. Another form of the iPool notice 102 is in the cookie file of the browser. Either or both locations can be used, as well as any other place likely to be read by a website visited. Typically, websites read the cookie file of browsers which have contacted them. In particular, many websites include on-line advertisements, or have arrangements with on-line advertisers 510, to display ads on the visitor's web browser. In addition, many of these advertisers 510 or other entities 520 read the visitor's browser cookie and then use it to (1) compile a profile for the particular visitor, in terms of identification, sites visited, transactions completed and the like, and (2) to present an ad to the visitor based on the profile information previously accumulate. However, in reading the visitor's cookie, the advertiser may see the notice code. In addition, the entities described in blocks 510 and 520 most likely will have been notified by iPool at step 235, that the encountered special code is specific notice that the individual specifically does not consent to having any of their personal or transactional information compiled, sold, transferred, or in any other way used.

If necessary, legal enforcement actions, including class action litigation may be necessary to protect the individual's rights against those who traffic in individuals' information after having been given notice to stop.

Figure 7:
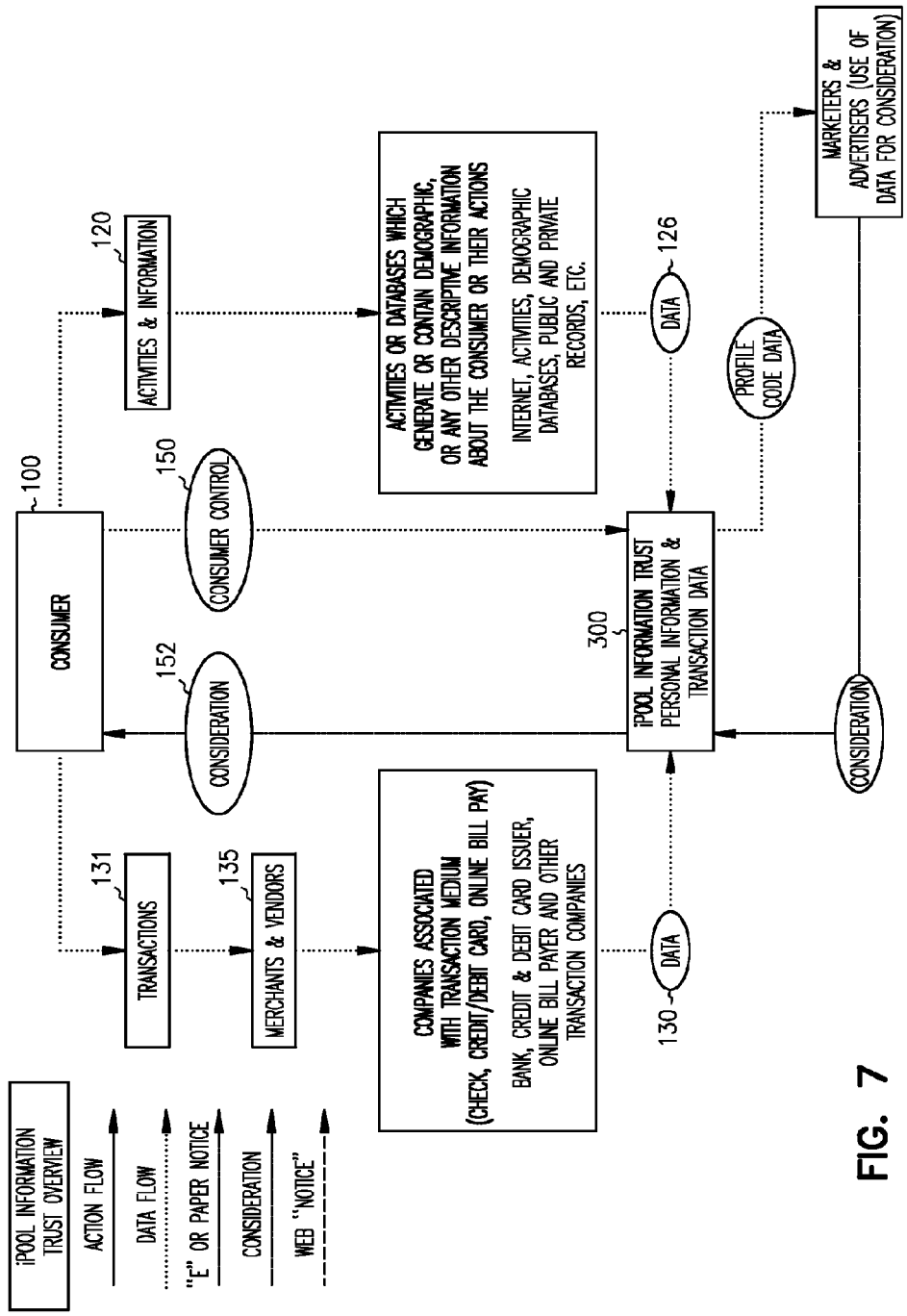
FIG. 7 is a block diagram of a portion of the system of FIG. 1 showing an overview of the function of the information trust for storage and optional limited use of copyright-protected personal and transactional information.
Figure 8:
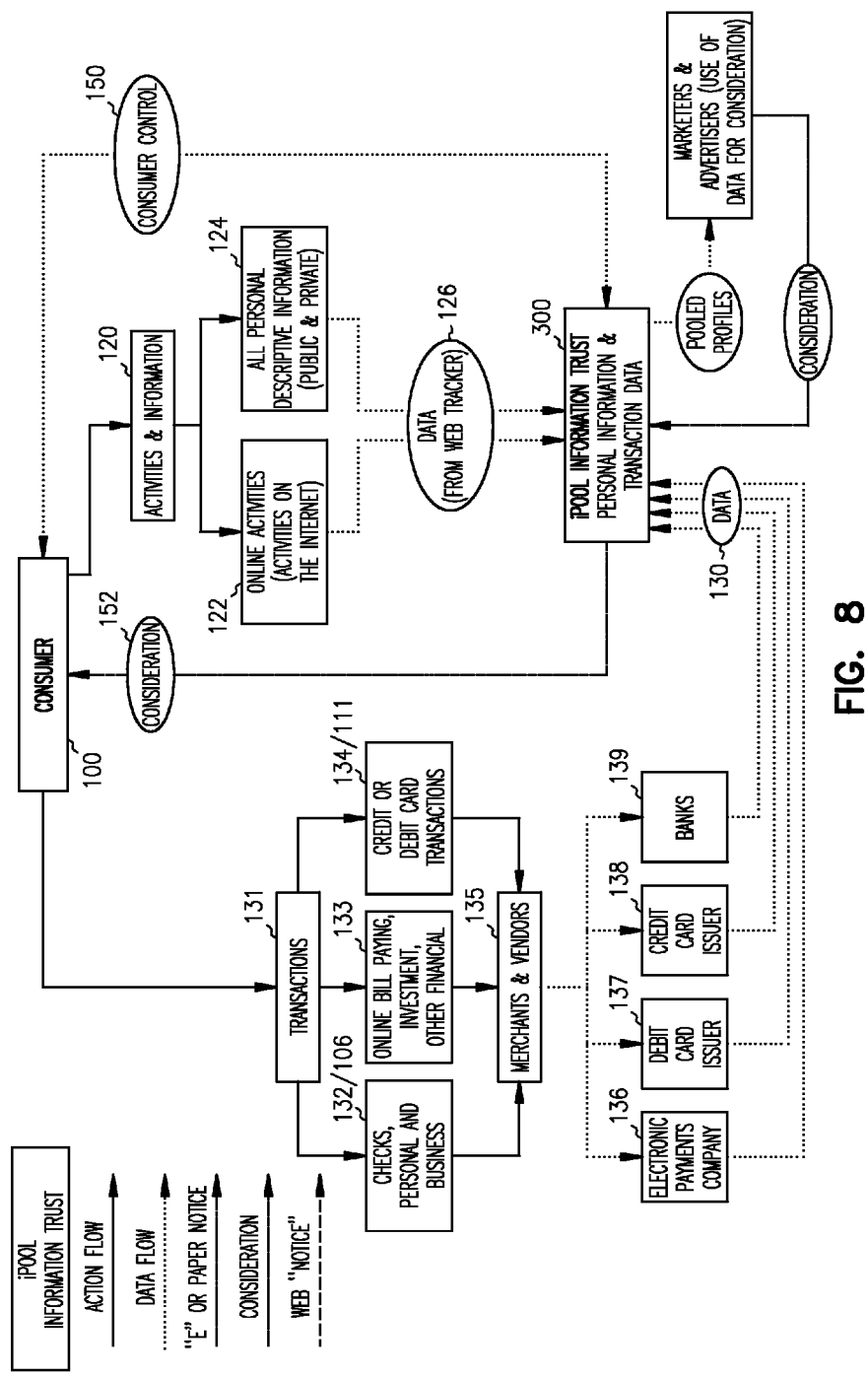
FIG. 8 is a block diagram showing the information trust of FIG. 7 in greater detail.
Figure 9:
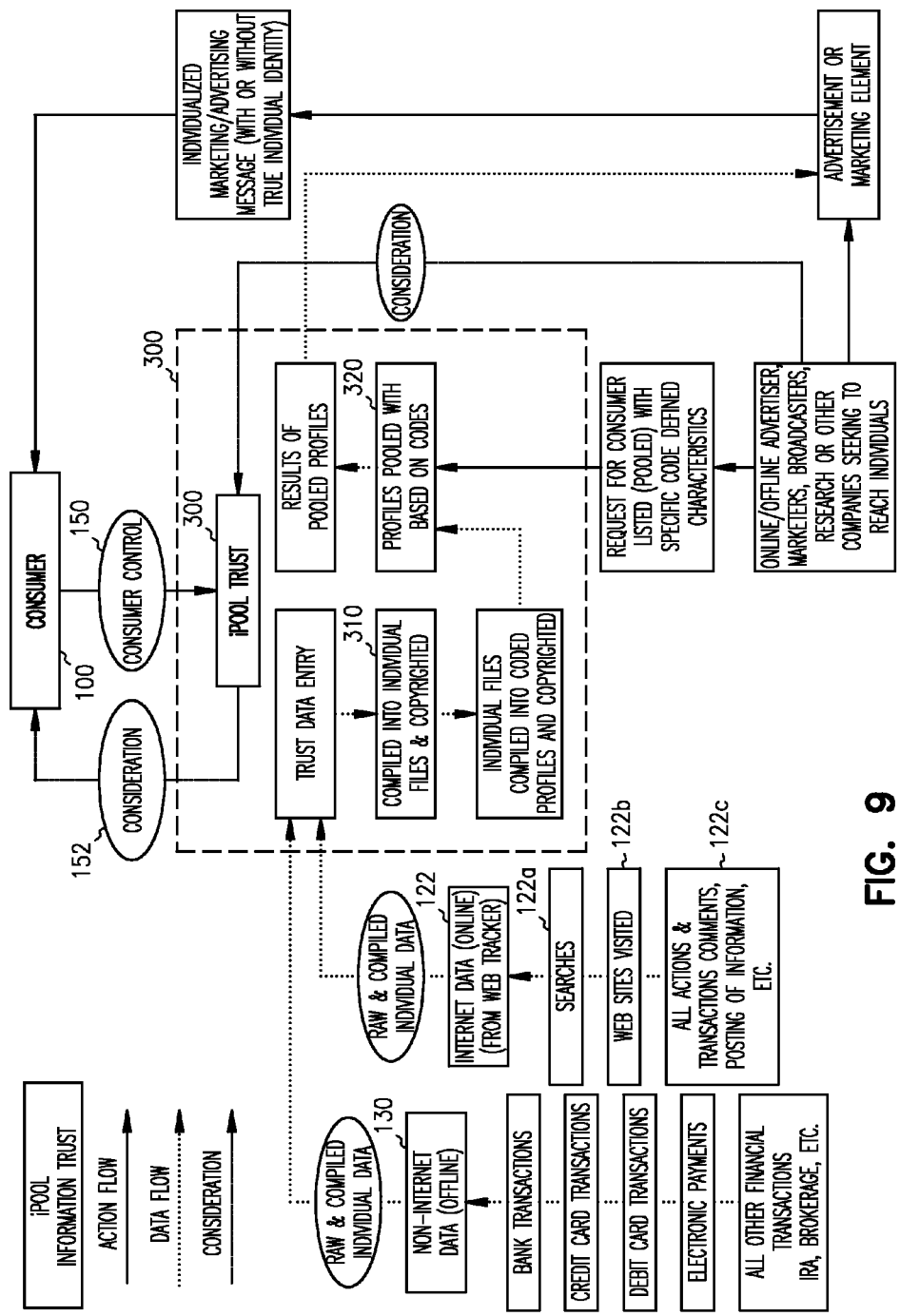
FIG. 9 is a block diagram showing additional features of the information trust of FIGS. 7 and 8.

FIGS. 7, 8 and 9 show how the consumers may pool their information in an information trust 300. The information trust performs two general types of functions on behalf of the consumer. One function is to serve as a repository for the consumer's own profile information, as part of the way in which trade secret and copyright protection is established and maintained in the information. A second general function is to form a way in which the consumer can optionally participate in making abstracted portions of his/her profile available to marketers under terms dictated by the consumer, principally including the payment of money or other consideration to the consumer. Such other consideration could involve providing free or reduced-cost broadcast content to the consumer's paid for by targeted advertisements based on abstracted profile information. The payment can be in the form of cash, credit towards a product, a coupon, other goods, services, or other elements that could be considered compensation.

iPool can assist the consumer in protecting his/her personal information. Currently, most consumers are not taking steps to protect their own information, with the result that various companies are gathering, compiling and selling the consumer's information. This is clearly an unsatisfactory situation from the individual's point of view. However, in addition to giving notices to companies, the individual can take positive steps to create and own and protect their own profile information. In the protection of databases or other collections of information, it is generally recognized that the more complex, detailed and diverse the collection of information, beyond mere basics, the greater its degree of protection under the law. The compilation of an individual's personal data coupled with a substantially complete record of commercial or Internet transactions clearly is protectable in law, including for example copyright law. iPool in connection with the information trust 300 provides a way for the individual to collect, compile and own their own personal and transactional information profiles.

Consider for example the case of an individual's Internet activity history. As an individual browses the Internet, he/she creates a browsing history which is unique to the individual, and which includes the identification of sites visited, including the times, durations, pages viewed, etc. This history is not mere basic information, but represents a highly selected, unique and valuable history. The value is unquestioned, which is why companies are trying to appropriate it. According to one aspect of the invention, iPool can provide a web tracker 126 (FIGS. 1, 8) software to the consumer. This web tracker software is installed on the member's computer, and serves to monitor and keep a record of all web browsing and other Internet activities done by the member. From time to time, the data from the web tracker is transferred to the individual's secured account in the information trust. There, over time, is built up a unique history of the individual's on-line activities. This unique information in the information trust, is owned and controlled by the individual member. The individual owns the history because he/she is the author of that file, because it is that individual who has made choices in browsing to create the file. Also, the individual owns the file because they have created the compilation through the same process. An on-line information gatherer organization such as those in blocks 510 and 520 who have been given notices 102 and 235 but who would persist in stalking the individual in their travels to the Internet and compile information to make a copy of the individual's browsing history, is seen to be a copyright infringer. If necessary, legal enforcement actions may be necessary to protect the individual's copyrights.

The same situation is true with the history of the individual's commercial transactions, such as from checks, credit cards and on-line bill paying. These data may also be added into an account for the individual in the information trust, for ownership and control by the individual.

The development of information in the information trust 300 is indicated symbolically in FIGS. 7, 8 and 9. The consumer's on-line activities 122 as compiled by the web tracker 126 are fed into the iPool information trust 300. As previously mentioned, this would include such items as searches 122a, websites visited 122b, and actions such as posting information 122c. All such information at 122 is compiled and added into the individual's account in the information trust 300. Also, off-line or non-Internet data 130 (FIG. 9) including transactions of a commercial nature, personal information, demographic information, financial information and database information can also be added to the individual's account in the information trust 130.

In addition, data 130 from commercial type transactions may also be included. In FIG. 8, transactions 131 that are initiated by the consumer include transactions involving checks 132/106, on-line bill paying and electronic transfers 133, and credit or debit card transactions 134/111. These transactions with merchants and vendors 135, including intermediary electronic payments companies 136, debit card issuers 137, credit card issuers 138 and banks and other financial institutions 139 may provide personal and transactional data indicated generally by reference number 130, which can be put in the individual member's account in the information trust. Preferably, this information is obtained, at the consumer's direction, in electronic form which iPool can transfer into the information trust.

Information in the trust can be edited by the consumer as necessary, then maintained into compiled files 310 for each individual. Thereafter, the individual has control 150 over what use, if any, may be made of his/her file and information. An individual may choose to allow no access to or use of his/her data file. Other individuals may opt to make certain parts of their information available on a pooled, abstracted basis 320. The individual can determine how much information, i.e., whether abstracted profile information, or true identity is made available, to what type of advertiser or marketer, and for what consideration 152. Some individuals do not mind receiving certain types of advertisements for limited subject areas which are of interest to them, so long as they have control over such access, so long as it does not expose them to junk mailers and telemarketers, and as long as they receive compensation therefor.

An individual instructs the financial service companies, credit-scoring companies, credit reporting agencies, and any other entity holding data about the individual, to send such data to the Information Trust. Alternatively, such companies and all other entities holding any data on the consumer, would automatically send such data to a specific file within the Information Trust that a consumer can later claim ownership of and control over.

Such a process also benefits credit scoring, credit reporting and other companies. Such companies could "deposit" all of their credit scores for all consumers into the Information Trust and declare the consumer owns their data, credit score, and credit reports. They would receive permission to use the data from the consumer and compensate them every time for its usage. This would both legitimize the activities of the credit reporting and scoring companies as well as compensating the consumer.

Such personal data of the consumer is stored within a file of the Information Trust. Upon request of the consumer or automatically, the data is translated to a series of codes that describe the consumer relative to age, sex, interests, marital status, race, income, homeowner status, uses of income, and any other desired categories. The individual codes define one aspect of a consumer.

Within each code area such as marital status there would be sub-codes that further describe, whether this was a first marriage or second or third marriage, the number of years married, sex of the partner and so on. The general codes and subcodes within a specific category would create a "profile" of the consumer. The more detail the codes, the better picture of the individual as a person in various areas. These codes may or may not have the specific identity of the individual within the codes.

The codes become a way to describe an individual. For example, married may be a code "100." Married to a female, may be code "100-05." Married to a female, with one male child by that female may be codes "100-05-06." When advertisers or other companies or individuals seeking to send or communicate, do market research or other activity, seeks to define a group of individuals to whom he wishes to communicate or evaluate for market research or other research, the advertiser or company defines the individual by a series of codes. For example and advertiser may wish to direct an advertisement to all married people. They would request that the advertisement be sent to all individuals with code "100." If the advertisement was to be delivered to males married to females with a male child, the advertiser would request that the advertisements be delivered to all persons with the following codes "50" (for male), "100-05-06."

The manner in which individuals may selectively choose to participate in permitted access to advertisers for compensation, is explained in greater detail in my patent application entitled "A Method and System for Delivery of Targeted Commercial Messages", (International Application No. PCT/US00/18059), a copy of which is attached and made a part hereof.

Content Broadcasting Supported by Viewer-Specific Commercial Messages

One important use for the pooled consumer information is to support the delivery of video and other content to the consumer's home. Targeted commercial messages, received on a voluntary basis and based on anonymous profile information, can generate enough revenue to pay for all or a portion of the subscription costs for a fiber-optic, cable or other video program distribution system. The consumer may be incented to such an extent to reveal their identity in select or many instances in order to receive greater compensation.

This aspect of the invention relates to the field of broadcast of informational, reference or entertainment program material of any type, generally referred to as "content", to one or more recipients. The invention is particularly adapted to the broadcast of video and audio or other streaming-type content selected to be received by one or more individual participants.

It is generally recognized that technologies exist which could bring high speed broadband (HSB) communications capability to each home. HSB is considered to be the ability to deliver full image streaming video media in real time. It is also generally recognized that such capability would bring great benefits to individuals, businesses, communities, and society at large. Such benefits would include greater entertainment choices for individuals and families, greater access to educational resources, and the possibility of telecommuting for workers, which not only benefits workers and employers, but which also benefits the community in reduced commuter traffic congestion and pollution. In addition, once broadband is provided to the home, networking within the home can easily provide improved competitive telephone service, a more advanced form of cable television, and numerous other benefits such as medical monitoring, fire and security alarm services.

While the technology exists for HSB service, cost is a major obstacle to introduction. In the case of fiber optical cable to the home or curb, it has been estimated that the cost of connection from homes to a neighborhood distribution points is about $ $2,000 to $3,000 per home. Wireless broadband is also possible, but faces enormous infrastructure costs in the development of extensive transmission and reception facilities needed to deliver HSB to homes in a community.

These costs are larger than most consumers are willing to pay as a "hookup fee" or reflected in a monthly service fee. It would be hoped that the user fees from entertainment content to be provided over a broadband distribution system could be the economic force to justify the investment needed to build out the broadband infrastructure in the first place. However, this is doubtful, because economic models for paying for such broadband content distribution are generally based on traditional economic models in broadcasting, and they fall short of the revenue needed for the large investment needed for true broadband. As a result, the aggregate costs to cover a city or region are too high for municipalities, current cable providers, or telephone companies, based on the expected rate of return from user fees. The aggregate costs may be too high that HSB deployment could not be capitalized without additional revenue streams. Additionally, deployment and operating costs may require a high degree of utilization by consumers and compensation or subsidies of their usage of HSB may be required.

From the beginning of commercial broadcasting (as distinguished from government-provided broadcasting as exists in some countries) the costs of broadcasting content have been paid in large part by commercial messages, which are broadcast in association with the content. Since the earliest days of radio and television broadcast, the listener or viewer has in effect paid a price for receiving the desired program. Traditionally, this price was not explicitly paid by the recipient in money, but was paid in terms of exposure to commercial messages. This exposure is valuable to advertisers, who pay advertising fees to the broadcaster, which fees are then available to support the costs associated with production or distribution of the content. Until recent times, this was the only commercial model for support of broadcasting, because in the early years it was not technically feasible to limit over-the-air broadcasting to a class of paid subscribers.

In more recent times, it has become feasible to limit broadcasts to individual paying subscribers, through the use of coder/decoder devices in cable or various types of wireless (including satellite) broadcast systems. However, the monthly subscription charges of such systems often only cover a portion of the cost of the content, and there are limits as to how much individual viewers are willing to pay to keep adding more choices. For these reasons, there are still commercial messages with some of the content broadcast on such paid-subscription systems. Thus, present paid-subscription systems are a hybrid, still in large part based on a traditional broadcast commercial message fee-based economic model and subject to all its limitations.

While the traditional broadcast commercial message fee-based economic model has provided a useful model to bring broadcasting to where it is today, it is becoming clear that this economic model is unable to move ahead to support the kinds of rich programming possibilities that current and future technologies have the potential to provide. The historical model is built on advertising following content. As content proliferates and is accessible through technology, the historical model breaks down. The methods set forth in this patent application recognize a new principle, that fee-based advertising acting to support a medium can only exist if advertising follows the consumer, rather than following the content.

Programming material presently exists, or could be easily made, having a wide range of subject matter interest that could be made available to viewers, if there were a cost-effective and profitable way to do so. However, the ad-based or hybrid fee- and ad-based systems of today may not economically provide for the installation of broadband technology to each home and cannot economically provide the home viewer with choice of a wide variety of content which would be needed to pay for new broadband systems of distribution.

It should be noted that available content for broadcast under present systems is largely limited to Hollywood movies, TV network news, TV entertainment programs, and the most popular sporting events. Many have come to think of these as the only types of content that are available. However, this limitation is due to the need of present broadcast economic models to appeal only to mass audiences. In fact there is an unlimited range of viewing subject matter that is of interest to potential viewers, but present broadcast infrastructures do not provide it. For example, while Hollywood movies are available, what about independent films, student films, art films or historic films? The same is true of sporting events. Popular sporting events from the major professional leagues and large college teams are broadcast, but minor sports or minor events are not. Yet there is at some level interest in sports from other countries, less popular sports, and/or amateur sports. For example, there would even be interest in viewing a particular high school football game, by alumni of that school who may now be scattered across the country. There are also historical subjects, travel and cultural subjects, a world of music beyond mass culture popular music, and interest in subjects relating to every avocation imaginable. In such cases, the interested audience may be very small, and are therefore not served by current broadcast systems. But this doesn't mean that specialized content and interested audiences do not exist; it just means that the current systems are incapable of serving them.

The necessity of present systems is that a piece of content must have a large potential audience, or it is not technically or financially possible to broadcast it. Part of the problem is the limited number of program channels available in present wireless or cable mass broadcast systems, which forces carrying only program material of large audience appeal. Another part of the problem is that the advertising messages which are broadcast with the content must also appeal to a wide audience.

It has long been recognized that the value of advertising is higher if it is directed to a focused or targeted audience who are likely customers for the product. It is not cost-effective to advertise to a narrow special class of persons over a mass-media broadcast, because the message of the ad is wasted on most of the audience. The pricing of the ad time is in effect based on the size of the audience, and is cost effective for common household products or services, but is too expensive for specialty products or services which appeal to a narrow class of potential customers.

As an example, consider the persons who are interested in flower gardening. There are many people interested in this subject, and there are many products relating to the subject which advertisers would like to place before these persons. However, the size of this group is very small compared to the desired audiences for mass broadcasts, and ad time during current network broadcast time is too expensive for this limited audience. Recognizing this opportunity, the current broadcast system will try to target this audience with a special program or perhaps a regular show that is placed in low-value time, such as late at night. The hope is that persons interested in flower gardening will seek out such programs, thus forming a target group for exposure to ads for related products. Such strategies achieve some success, but ultimately are limited by the same reasons: narrow audience, and relative costs of ads. Even specialty programs at unfavorable times must still compete with demands from other specialties as well as mainstream programs and ads.

As one moves toward even more specialized interests, with even narrower audiences, at some point it simply becomes infeasible to provide a broadcast program to associate with ads.

Present systems thus leave us with a two-edged irony: even though present technology could bring a wide variety of content to a wide and diverse audience eager to receive it, the present systems are not economically able to deliver it; and, even though there are people with highly attractive demographics who could make desirable target audiences for high-valued commercial messages, present systems are not able to deliver to them. As a result, the present systems have not been able to generate enough revenue to fully or substantially pay for the investment needed for true broadband delivery to the home.

The present invention provides a way to overcome these problems. According to the present invention, viewers will each be given their own choice of content to receive from the whole range of available content, not just the content chosen by a network or cable operator. Preferably the viewers are given the choice to pay for content or to have a part or all of the cost paid by advertising which is of relevance to the particular viewer's interests, needs, or that the viewer is within the target market of the advertiser. Beyond payment for the cost of content, the invention also contemplates viewer financial accounts to accept payments from advertisers for viewing the specific ads. Owners and creators of content will have an affordable way to make their content accessible to all potential viewers, even if the content would only appeal to a narrow range of viewers and would not be carried by conventional content distributors. Advertisers will have the opportunity to target their ads to the most relevant pool of potential customers. The resulting high value for ads can be used by system operators to finance and pay for the needed investment in broadband infrastructure.

According to a feature of the present invention, specific commercial messages are decoupled from specific broadcast content. While commercial messages are still associated with the receipt of broadcast content by a participant, the selection of specific commercial messages is made based on the specific recipient, and not primarily on the specific content being received.

In a preferred form of the invention, participants may elect whether to receive commercial messages in association with content. Participants may elect to pay for content, through some combination of monthly and per program fees, to thereby receive content commercial-message-free. However, most will elect to receive content at a reduced fee or no fee basis in exchange for receiving commercial messages. If so, the commercial messages they receive are selected specifically for them, based on viewer profiles. Because different individuals have different profiles, two individuals receiving the same content will probably be receiving different commercial messages associated with that content. Selecting the commercial message based on the viewer's profile increases the value of the ad from the advertiser's point of view. The feature of the present invention of decoupling of the commercial message selection from the content in the broadcast permits greater user choice and more effective commercial message exposure.

From the brief foregoing discussion and the detailed description which follows, the main features of the content broadcasting aspect of the present invention include the following:

The method provides an economic model for paying for the installation of the HSB infrastructure to the home.

The method provides practically unlimited choice and selection of content for the subscriber/participant, rather than the limited range of selection provided by broadcasters and distributors under present models. This in turn will lead to higher usage for the system, which can directly or indirectly increase revenues to help pay for the cost of installation of the system.

The method can provide, as an alternative to pay-per-access to content, a system of high value, focused and targeted commercial messages for participants, and because these commercial messages have higher value than conventional advertising linked to specific content, they will generate more revenue, which can subsidize programming and help pay for the cost of installation of the broadband system.

According to one aspect of the invention, profiles are established for participating subscribers, which have demographic, consumer, financial and psychographic information about the participant. This information is preferably in a coded form, to be used in the selection of advertisements. The information is preferably based not only on information provided by the participant, but is also supplemented and verified by sources not directly provided by the participant, such as transaction records from credit card companies. Without identifying the individual participant to potential advertisers, the profiles of individuals and groups can be matched against the desired target audience for each individual advertisement. A consumer may be incented to provide more detailed information including their identity for compensation. The value, in terms of price paid by the advertiser per exposure, is based on the quality of the match of the viewer profile. In fact, individual ads undergo a form of bidding such that the higher fee ads for a giver participant profile are given priority over lower-fee ads. That is, the viewer will watch the ads in the order of who paid the most to purchase the viewer's "face time."

In this manner, a series of advertisements are queued up for each individual participant. These ads are delivered to the participant in association with user-selected content, for example at the beginning, end, or during a content-accessing session. The ads which are queued for a participant are based on his/her profile and the amount that an advertiser wishes to pay for the ad exposure to that profile. The ads are not necessarily related to the selected program content.

In this manner, the highest value is realized for the displayed commercial messages, and this value is used to pay for the content, pay for the installation and maintenance of the broadband system, possibly to subsidize additional types of content, and make payments to the individual viewers of the targeted ads.

Thus, to return to the flower gardening example discussed above, the gardening enthusiast may be presented with ads for gardening supplies, even while watching a general interest movie. This specific gardening-related ad, delivered to this specific person, has a much higher value than the generic product commercial normally packaged with movies on conventional broadcast systems. This has many benefits. Viewers are happy because they are not bothered with ads that do not interest them and they may actually look forward to seeing ads for products and subjects they are interested in. Advertisers are happy because their overall advertising costs are lower, even though advertising fees per exposure are higher, since the ads are only going to the target audience. The operator or other entity financially responsible for the broadband network is happy, because sufficient funds are generated to support the system. Finally, independent owners or creators of content are happy, because they have a market for viewership of their content, without having to tailor it to match a demographic group for advertising support. Put another way, if a content provider has a video about winemaking, for example, he/she no longer has to find a sponsor with a product to match that interest. The content provider can make the content available to viewers, and the advertising is provided by products unrelated to winemaking, as linked only by the profiles of the viewers who chose to receive the content. The per-view charge for the winemaking content is then in effect paid or subsidized by the ads shown to viewers, which ads most likely have no connection to winemaking at all.

FIG. 1 is intended to be an overview of how the system is configured and operates. Reference number 100 designates a series of houses, representing homes of subscribers/participants in the broadband distribution system. It will be appreciated that the house symbols are only by way of example and convenience of explanation, not by way of limitation. Participants may be at house locations, in apartments, hotels, at various types of business locations, or in mobile installations such as vehicles, where the participant receives broadband by wireless including satellite, and anywhere else the broadband connection is made by whatever technology is used.

For purposes of this patent application, broadband is used in a relative way to cover whatever bandwidth connection is needed for a desired type of service. For example, slow-scan small pixel dimensioned video may be acceptable for many types of content. Lower bandwidth is acceptable for other classes of service, for example content consisting of reference and research material. But for many subscribers, broadband will mean something approximating full-screen, full-motion video. This is what will usually be requested for entertainment content.

Such HSB can be provided by numerous present and future technologies. Current favorites include lasers, electronics, fiber optics, cable, and microwave wireless, but the invention is equally applicable to all transmission technologies. Once the link is brought into the home or other location, it is preferably connected to a local area network, such as an ethernet network, so that various types of television receiver/monitors, telephones, computers, and monitoring devices (or devices which combine some of these functions) can be connected.

Reference number 1200 FIG. 1 represents functions associated with an operator of the broadband distribution facility. This entity can take many forms. However, for purposes of illustration and explanation, but not by way of limitation, the reader may consider the operator entity to be a municipality, who has put in place a distribution medium, for example fiber optic cable or broadband wireless, accessible to the locations within the municipality. However, as will become clear after reading the entire specification, the operating entity and the locations it serves may be local, regional or of any geographical size or shape. Furthermore, it does not even have to be a geographical entity. Depending upon the technology used to distribute the content, and depending on ownership, access, control and finance issues for the distribution network, it would be possible for the operator entity to have individual subscribers in diverse locations, scattered around a country. However, as stated above, for illustration purposes, the invention will be described in terms of a local community.

The operator entity performs coordination functions, as described in detail below, among the participants, advertisers/queued ads, content and content providers.

Part of this coordination involves a function indicated as the control box, also referred to herein as the Shadow Box, represented in FIG. 1 by reference numbers 1110*a* and 1110*b*. This is a switching function, as described herein, and may be implemented in hardware or software or both, as a separate chassis or "box", or its functions may be included in any number of components of the overall system Likewise, the Shadow Box function can be performed at the participant location, as indicated by reference number 1110*a*, or at an upstream part of the distribution system as indicated by reference number 1110*b*.

The function of the Shadow Box is to integrate the content which the participant has selected to receive and the ads which will have been selected for that participant, as described in detail below, and as described in the original co-pending patent application, which is incorporated by reference herein.

Figure 10:
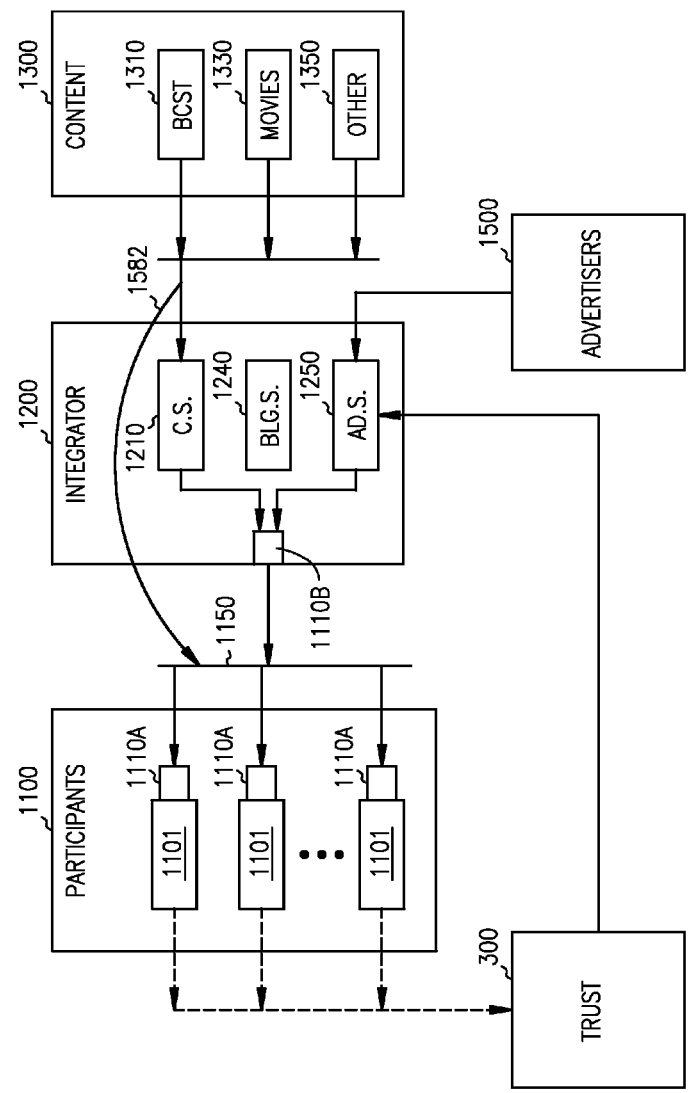
FIG. 10 is a block diagram of a broadcast content delivery system supported by viewer-specific targeted commercial messages.

The Trust entity shown as reference number 300 in FIG. 10 is a pooled consumer profile and information trust, such as iPool, substantially as described above. Participants in the Trust sign up and provide certain personal information to the Trust. This information is used to establish profiles for each participant, preferably in a numeric or other coded form which can be accessed and sorted to develop groups of profiles relevant to an advertiser's proposed target audience. Participants, identified only by profile, not personally (though some may choose to do so if they are given strong incentives), are shown the commercial messages according to their profiles. In return, they receive compensation for basic identification and additional demographic, economic and interest information.

Content providers are generally indicated by reference number 1300 in FIG. 10. As explained in greater detail below, this category includes a wide variety of sources. Included are present and future Broadcasters 1310, Movie Sources 1330 and other Content Sources indicated by reference number 1350.

Category 1310 can include broadcast networks and cable networks much as they now exist, and it can accommodate such entities as they may change in the future in response to the broadcast methods of this invention. Much existing broadcast network content has pre-sold advertising, such as is currently being placed by mass-market advertisers. This advertising can and will be delivered with their associated programs to the participants. Because they carry their own ads, such content is likely to be free of charge to the Operator Entity 1200 and the Consumers 1100.

Increasingly, content from broadcast networks has spots for regional or local ads. These spaces can be filled from the Ad Servers 1250 with individually directed ads to Consumers 1100 based on their individual or household profiles.

Similarly, Movies 1330 are presently distributed by networks including cable networks, sometimes with ads pre-sold and distributed with the content. Increasingly, these will have unfilled spots to be filled by the Ad Servers 1250 to individual consumers according to the present invention. In addition, movie studios, or other producers or owners of content will wish to distribute directly to consumers, without the need for the movie network middleman. This will be easy to do under the broadcast and advertising methods of the present invention, because the movie content holder can be paid for content by the individually-directed ad mechanism of the present invention. Thus, the movie content holder, such as a movie studio, may make its content properties available to Integrator/Operator Entities 1200, and the distribution, ad placement and payment is all taken care of by the method of the present invention, without the movie content holder having to deal with any networks or advertisers.

In FIG. 10, reference number 1350 generally designates the transmission of the content from the Provider 1300 to the Content Server 1210 of the Integrator/Control Entity 1200. This can take any form. The content can be streamed by any distribution method including satellite, cable, microwave or other land line. This can be done on a pre-set schedule day and time, such as is currently done by conventional broadcasters. However, increasingly as the targeted ad payment method of the present invention grows, the distribution may be on an on-demand basis, as initiated by viewer request. For convenience, some content owners may provide their content in electronic form for storage at the Integrator 1200, where it can be streamed to requesting viewers on demand by Content Server 1210.

In FIG. 10 reference number 1500 refers generally to advertisers. This includes companies and advertising agencies, who produce advertisements and who wish to have them placed in front of a targeted audience for the advertisers' particular products or services.

According to the method of the present invention, Advertisers 1500 do not have to be involved in selecting the specific program or content with which to associate their ads in hope of reaching their target audience, as in conventional broadcast methods. Instead, advertisers provide their ads to the Ad Servers 1250 of Integrator Entity 1200, and similar ones around the country. They also provide information, preferably coded in a defined format, as to the profile or profiles of consumers they wish to reach, and how much money they will pay for each viewing to those in the target profile(s).

The consumer profiles are developed and held in Trust 300. The consumer gives his/her information to the Trust, to be used for profiles, and this is indicated generally at reference number 1120 of FIG. 10. The consumers/members provide the Trust with personal, demographic, financial and transactional information to be used for developing consumer profiles. In addition, it is preferable that in making the profiles, the Trust has access to verifiable information from other sources, not directly provided by the consumers. This can be, for example, bank card records of purchases, provided with the consumer's consent, but provided directly from the bank. This makes the profile more valuable. For example, it is valuable to an advertiser to know what type of car a consumer says he/she is interested in; however, it is also important to know what type of cars the consumer has actually bought and owned as well as their current financial and demographic profile. The profiles for individual consumers can also contain exclusionary codes to indicate categories of advertisements which the consumer does not wish to see.

Advertisers pay for access to the profiled consumers, who are only identified anonymously by profile and not personally identified to advertisers, and the consumers are in turn compensated by the Trust. This compensation may take the form of free or reduced-fee access to broadcast content which they select.

Trust 300 provides coded profile information to Operator 1200 and this, in conjunction with the price and target profile information from Advertisers 1500 is used to develop ad queues for each Participating Home 1101. Thus, each Subscriber Home 1101 who participates in Trust 300 has an ad queue which is developed specifically for them, based on (a) their profile, (b) the target audience profiles requested by Advertisers, and (c) the price per view which the advertisers are offering for that profile. Different consumers, as identified by their profiles, have different values to different advertisers. Consumers who are highly sought by some advertisers, will not be sought by other advertisers. A household may only be worth a fraction of a cent per view for a soap commercial, but may be worth many times that to the maker of some type of specialized goods which match the profile of the household.

In this manner, each participant has at any given time, a queue of ads to be shown, and most likely, this queue of ads is unique to the specific participant.

If a household chooses not to participate in the Trust, then no specific profile is created, and they will not get the benefit of free or reduced-fee programming. Ads may still be shown based on general community demographics.

The Billing Server 1230 functions to keep track of billing the advertisers for the shown targeted ads, and paying the content providers. The manner in which it does so is described in detail below.

As a Participant 1101 chooses to select content to receive, Content Server 1210 begins to distribute it to his/her location over Broadband Distribution Net 1150. Although this net extends over the community (or larger area as discussed above) and connects to all subscribers, information broadcasting is addressable individually to the participant. This can be done by any of a number of techniques, such as an IP or other packet addressing scheme.

In connection with the Participant-selected content, the Integrator 1200 transmits ads from the Participant's specific ad queue. Ads may be shown before, during or after the selected program. Most likely, content providers will provide designated spots in their content, indicated by a standardized control signal, for the automatic insertion of ads. The Shadow Box 1110a or 1110b functions to switch between the selected content and queued ads for each individual participant.

Content can be by general broadcast or on-demand broadcast which responds to an individual's request to be played back immediately or at a defined time. When content is broadcast and acquired either way, the content can have advertisements individualized to each household, each individual viewer, or to the content viewed (to reflect the viewer).

As the viewer accesses the Content 1300, the content interacts with the Advertising server 1250. Based upon the requests of advertisers, specific advertisements are placed into the content that are likely to be unique to the household. To the viewer, the content streams to them in a normal fashion, but the advertisements may be partially or fully different than another viewers.

Content is stored on digital servers or "processed through" servers even if "live broadcast." Within the content are electronic markers that define where advertisements could be inserted. Advertisements may already be in place within the parameters of some or all of the electronic markers. Some content may not have electronic markers. In these cases advertisements will be human inserted or at computer selected time points.

The electronic markers may communicate more than just placement of the advertisements. Such markers may set parameters on what type of advertising can be placed within the content. For example, a family entertainment show may prohibit advertisements for alcoholic beverages, or adult subjects. The electronic markers can also lock in the existing advertisement for a specific slot in the content. For example, Coca Cola may contract to buy all viewers for a set price to the content producer or distributor. The electronic markers will define the content area that can have advertising, acceptable advertising for that content, and other parameters set by the content producers, distributors, artists, households or individuals viewing the content, or other parties.

When the content is accessed, the Integration System 1100 knows the "identity" of the household viewing or requesting the content. The identity of the household is communicated by the viewing device or peripheral to the viewing device utilized by viewer. For example, if the content is being viewed through a computer 1103, the computer has logged on or communicated its identity to the Content Servers 1210. The same would occur with a traditional television through a peripheral device such as a set-top-box. A digital television may be able to communicate its identity directly to the content server.

As the content is being delivered to the household, advertisements are inserted into the content guided by the electronic markers or simply inserted into the content if the content has no electronic markers. If advertisements are already contained in the content, all or some are "over-written" by the new inserted ads. Some existing advertisements may not be over-written by new advertisements due to a contractual relationship between the content producers and the advertisers or other party, and the electronic markers will identify these. Some advertisements may be overwritten only if a new advertisement has met a greater payment or other compensation threshold to the content producer, content distributor, artist, consumer or other controlling entity or person.

Commercial messages to be inserted are stored on Ad servers 1250. These ad servers may be in the home or at a central location serving few to millions of homes. As a household accesses the content, the content is processed through the Ad Servers 1250.

The Ad Servers 1250 insert advertisements unique to that household or individual into the content being viewed. When the "Smith" family is watching a "program of content" the advertisements within the content may be unique to the Smith family. If the Smith family were to change to view different content, the advertisements they are to see would remain the same. Such advertisement placement can be anywhere in the content, before the content, after the content or during the content as a "small window" in the content.

Advertisements may be further individualized if the viewer logs on his identity or identity code to the content or advertising server. For example, if Mr. Smith logged on to a viewing device such as a computer 1103, his advertisements within content would different than his spouse, who has a different profile, even if they were watching the same program through different viewing devices. Mr. Smith may log into the content or ad server, but also indicate that he is watching the content with the family or other persons, which may change the advertisements delivered. Mr. Smith may also choose to block specific advertisements.

Advertisements may also be content sensitive. For example, if none of the household has logged on, but a viewing screen is showing cartoon content, it may be assumed that a child in the Smith family is watching the cartoons. Advertisements within that content would then be specific to the child, and not Mr. or Mrs. Smith.

Advertisements may not appear in some content for some households. For example, if the Smith family is contributing members of their local public television station, this would be reflected in their profile. When they watch the content from the public television station to which they are members, they see no ads in the content. However, their neighbors who are not members of the public television station will see advertisements within that content.

Based upon information from the iPool Information Trust advertisers, using the consumer profile codes from the iPool Information Trust, decide which consumers they want to direct their advertisements to. These advertisements are then accumulated and stored on an advertising server. When a specific household accesses content, the advertisements are run in the order of who paid the most to reach that household or individual.

While FIG. 10 shows a Transmission Path 1580 for the content from the content providers to the Integrator 1200 Content Server 1210, it is also possible that the content could be streamed directly from the provider to the Participant 1101 as indicated by Transmission Path 1582. This should preferably be done with coordination with Integrator 1200 so that ad server and billing server functions can be accommodated.

It will be appreciated from the above overview that maximum efficiency is achieved by decoupling the commercial messages from the program content, by allowing the user to choose the content, and allowing the profiles and advertiser interest to select the ads. In some instances, however, it may be desirable to have some linkage between the choice of content and ads. This is primarily seen as an exclusionary device, in that some content providers may not wish their content to be associated with certain types of advertisements, and vice versa. A provider of children and family-oriented content may not wish to have certain type of adult-oriented ads shown with it Likewise, a maker of a certain type of product may not wish to end up having its product associated with certain types of content which it thinks is inconsistent with the product image. For this reason, content classification codes, and product/service classification codes are used, and serve to create exceptions in the development of the ad queues for viewers.

Figure 11:
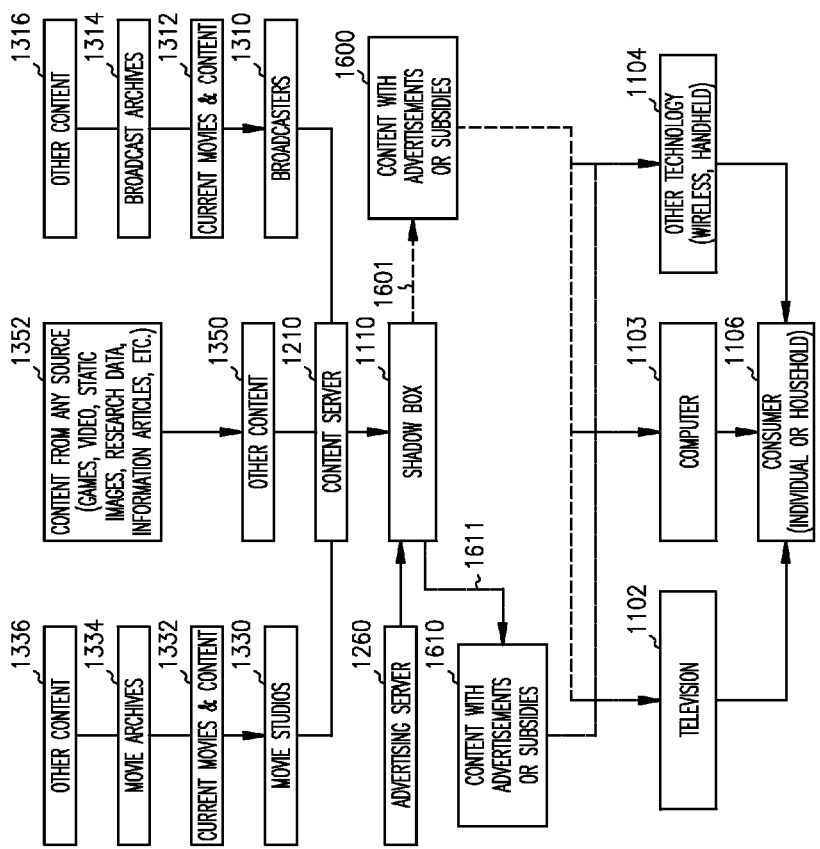
FIGS. 11 and 12 show block diagrams or function flowcharts which illustrate particular methods performed by the system of FIG. 1.
Figure 12:
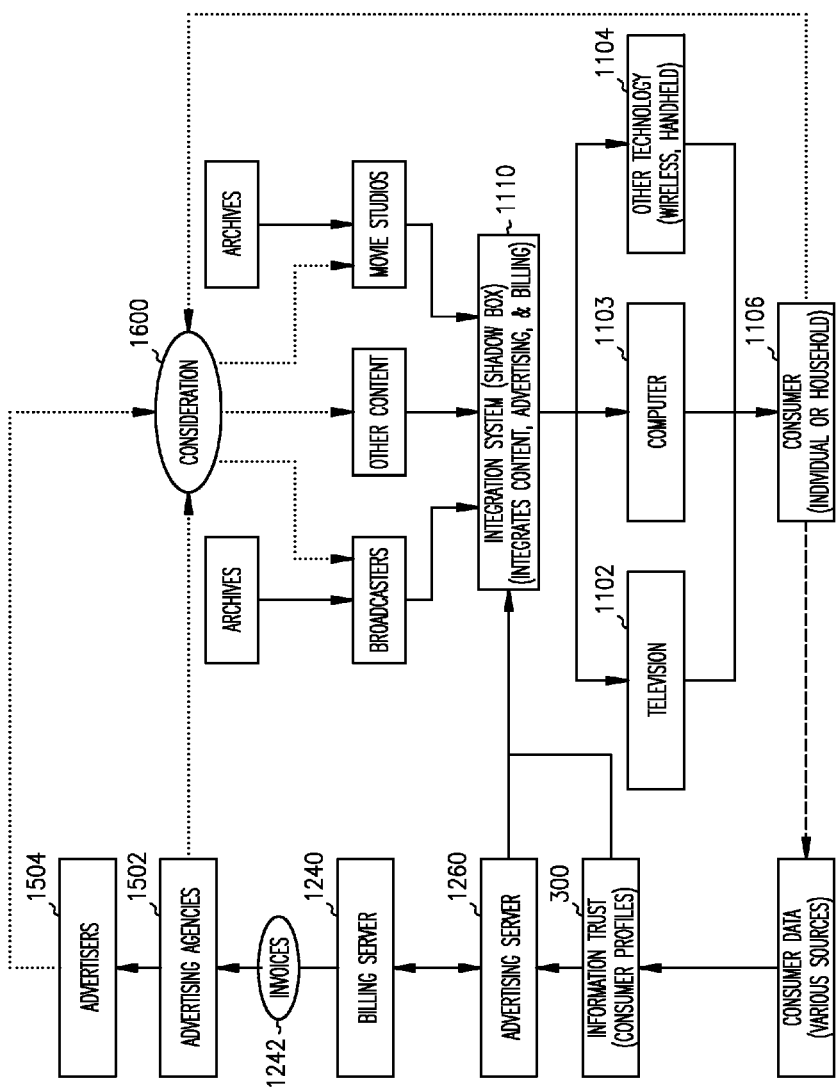

A system level overview of the operation of an embodiment of the invention was described above with reference to FIG. 10. FIGS. 11 and 12 show functional blocks and flowcharts which illustrate particular methods performed by the functional elements of FIG. 10. It will be appreciated that these flowcharts and the accompanying description enable one skilled in the art to develop such programs, firmware, or hardware, including such instructions to carry out the methods on suitable computers.

FIG. 11 illustrates one example of the overall system which will be referred to as the "1-2-1 System" (one to one system). The 1-2-1 System in this example is comprised of Content System/Server 1210, Advertising System/Server 1250 (both shown in FIG. 11), Billing System/Server 1240, Information Trust System/Server 300 (both shown in FIG. 12), an Integration System/Server, the "Shadow Box," 1110*a* or 1110*b*, and a receiver of content and advertising or advertising by itself and utilized by a Household or Consumer 1101.

These systems are linked by a means of communications such as wireless, fixed wire, fiber optical cable, coaxial cable, or other means.

The Content Server 1210 is a digital system to broadcast (deliver) content over any communications platform. The Content Server 1210 can be located with the Integrator 1200, or with specific Content Providers 1310, 1330, 1350 or a combination of any or all. The Content Server 1210 can either push broadcast or allow pull broadcast. Push broadcast is where the content system is sending out content on its own and consumers are receiving the content into their receiving device (Television 1102, Computer 1103, or Other Device 1104). Consumers may have a system that records push content for later play. Pull broadcast, in this example, is the process where the content server is broadcasting the content to the consumer based upon the consumer's instructions to deliver the content to a particular receiving device at a defined time, including immediately. Push and pull broadcast may be available on the same system at the same time.

FIG. 11 shows that a content system may have sub-content systems that "feed" content to the larger content system for distribution of the content on a broader basis. This includes Movie Studios 1330, who have content consisting of Current Movies 1332, Movie Archives 1334, and Other Content 1336 which could be any type of content a movie studio or film rights holder would chose to make available. Content also includes Broadcasters 1310, who have Current Show Content 312, Archives 1314 of older shows, and Other Content 1316 which can include anything they wish to make available for viewing.

Content also includes Other Content 1350, which can include whole new classes of content beyond movies and broadcast content. This can include content such as Games (including interactive games), Videos, Static Images, Research, Data, Information and Articles. As an example, a local high school may not have the means to distribute the live video of its homecoming game to all who want to access the game from a receiving device. The high school can send its content, which is the football game, to a larger content serving system that broadcasts (distributes) the football game to all who wish to receive such content. Availability can be listed on an Internet web page or other web-like service accessed by consumers, who may then select the content for broadcast to them. The content of the football game may remain on the serving system for broadcast to any receiving device for weeks, months, years and even indefinitely.

Another aspect of this invention is the uploading of content and advertisements. Both content and advertising could be directly uploaded via the Internet into the Shadow Box system electronically. Content producers and advertisers would be directed via a website or other means as to how to upload their materials from their computer, DVD player, CD player or other digital device. Advertisers and content producers could define various parameters for usage. Payments would be via credit card, debit card, or some other electronic means. Advertisers with an acceptable credit rating could have an account and be billed and make payment by another means.

The advertising server/system 1260 consists of a digital device able to store advertisements and other commercial messages. The advertisements can be video, static images, audio, e-mails, or other sensory material. In this example, advertisements are stored in such a manner that they can be assigned to specific content that is broadcast to a specific consumer's receiving device. The advertisements can be sent alone (like electronic direct mail advertisements), attached to content, integrated into content at specific intervals, or integrated randomly. The advertisement may appear at the same time as broadcasted content, or somehow linked to content. The advertisements may have a priority system that allows an ordering of advertisements as to which advertisement would be seen first, second, third and so on, in a specific order. The advertisements may actually be in the content itself. For example, a performer in the content may be drinking one type of beverage or brand of a beverage in an advertisement directed at a specific consumer. However, the performer may be drinking a different type of beverage or brand of a beverage in content that is directed, even at the same time, to a different consumer. The advertising server would be able to integrate specific advertisements in any manner, into any content in any manner. For example, advertisers would be able to position their advertisement to be seen at any time and in any order relative to content or other advertisements, aligned to a specific piece of content, or to a specific receiving device or devices.

The Shadow Box function 1110a or 1110b integrates the content selected by the consumer and the advertisements to be displayed/sent to the consumer. The Shadow Box can be a "set top" box 1110a that is within the consumer's household, or within a content receiving device that the consumer utilizes. The Shadow Box may be in a central location 1110b or in distributed locations. The Shadow Box distributes advertisements to those consumers selected by the advertiser or the advertiser's agent.

The Shadow Box 1) integrates advertisements into content, 2) attaches advertising to content, 3) runs the advertisement at the same time as the content, 4) inserts the advertising directly into the viewed content, 5) sends stand-alone advertisements, 6) or integrates content and advertising in some other manner. Content without advertisements, indicated by reference number 1600, is delivered to the consumers' homes as indicated by path 1601. Content with advertisements 1610 is delivered to consumers' homes as indicated by path 1611. Physically, paths 1601 and 1611 would probably be the same transmission media, but are shown logically separate in FIG. 2 to describe both cases.

The participants receive the content, with or without advertising, at their Homes or Other Locations 101. The content may be viewed, listened to, or stored and used later, using any type of receiving device, which generally is any device or apparatus that allows an individual to receive content in some manner. The content receiving device may be a television, radio, computer, newspaper, e-book, handheld device, or some other emerging form of technology that allows a consumer to receive push or pull broadcasted material or stored material within the device itself. This includes, for example, Television 1102, Computer 1103, and any other type of Receiver 1104 which may include a wireless device, handheld device, personal digital assistant, game box, recording device, or any type of device that includes some or all of these functions. The Computer 1106 may be any type of computer, for example the type having a CPU, keyboard, mouse or other pointing device, and a display. The display may be shared with the TV, or vice versa, or the computer and TV functions may be integrated to any degree. All or some of these devices may be networked within the house by ethernet or the like, such that the data stream entering the house may be used by multiple devices or users.

The Consumer (Individual or Household) 1106 receives the content and messages through any of the receiving devices.

The Information Trust 300 collects demographic, financial, and other Information directly from the consumer and other sources, as previously described. The consumers' data is assembled into profiles and these profiles are assigned a series of profile codes that reflect the specifics of that consumer or household or whatever it may represent. Such codes could represent any combination of consumers or characteristics of consumers, their households, neighborhoods or other factors that could be defined. The advertisers can then request that their advertisements be sent to consumers that are represented by any specific profile codes, which match the code or codes the advertiser has selected.

The Billing Server/system 1240 is a digital system that monitors the delivery of advertisements to specific consumers and bills the relative advertiser or the advertiser's assigned agent for the delivered advertisement. In FIG. 12, Billing Server 1240 is seen as connected to Advertising Server 1260 to monitor and log message delivery. It generates Invoices 1242 (preferably electronic) which are presented to Advertising Agencies 1502 and to Advertisers 1504.

The flow of payment or Other Consideration 1600 is shown in dotted line in FIG. 12. Payments are received from the Advertisers 1504 or Advertising Agencies 1502 for showing the ads. Consideration also flows from the Consumer 1106, for the basic subscription fees for the service, less the offset for the amounts credited to the consumer for ads shown. Note that in some cases it is conceivable that the flow could be a net positive for the consumer, if the ad showings' revenues are high enough. Consideration is also sent to the content providers, according to the price and number of viewings distributed.

In the following description is but one example of how the 1-2-1 system could be used. Suppose that Ford Motor Company has a television advertisement for its Aerostar minivan. It determines that women with the following characteristics are the target audience for this advertisement: 1) between the ages of 28 and 35; 2) with two to three children; 3) the children's ages are between 1 year and 5 years; 4) household incomes between $35,000 and $60,000; 5) living in any of the following 200 zip codes (listing of codes); 6) possesses an automobile six years or older.

Ford Motor can determine any specifics as to the type of content they want to have their advertisement appear in, at what time the advertisement runs, and any other parameters they wish to set. They can allow the 1-2-1 system to insert the advertisement in any content the target audience is watching.

The Information Trust 300 sends the electronic addresses of the consumers to the Shadow Box 1100. The Shadow Box or the advertising system server (whichever is more efficient) takes the selected addresses and links them to the Ford Motor Aerostar commercial. When the consumer is watching any content or the content selected by Ford Motor, the Aerostar commercial is integrated into the content. There may be a feedback system that would allow the consumer to interact with the advertisement in such a way as to ask questions, request literature, request pricing, arrange for a sales person to call and so on. The consumer could receive compensation or other consideration for such interaction. The interaction system may be also used to verify that a consumer or specific consumer has watched or received the advertisement.

It will be seen from the foregoing description that the combined power of individual consumers, when exercised through a pooled personal data rights organization such as iPool, can help them to assert ownership over their personal and transactional information; and it can provide for compensation in the form of free or reduced-cost distribution of desired broadcast content.

I claim:

1. A method for a privacy organization to manage a privacy interest for a person, comprising:
   acquiring via a website information about the person, wherein the information includes personal information about the person or transactional information about the person;
   digitally storing the information about the person as protected information in a secure account for the person within a database accessible by the privacy organization and accessible through the website by the person;
   automatically coding a digital profile for the person using the acquired protected information to create an abstracted profile code for the person using at least some of the acquired protected information;
   digitally storing the abstracted profile code of the person in the secure account within the database;
   automatically entering the protected information into notices asserting data ownership over the protected information for the person;
   asserting data ownership over the protected information for the person, including providing the notice that the person is asserting data ownership over the protected information to entities capable of collecting data about the person from transactions, interactions or Internet activity, or capable of using or selling collected data about the person;
   providing the abstracted profile code to select entities; and
   receiving from the select entities consideration for the person in exchange for allowing the select entities to use the abstracted profile code with at least some of the protected information,
   wherein acquiring via the website information about the person includes:
      receiving information from the person;
      allowing the person to view and edit the protected information in the secure account;
      receiving instructions from the person for managing the protected information, wherein the instructions include instructions for sending the notice and selecting the select entities to whom the abstracted profile code is sent; and
      delivering code for installation on an electronic device of the person, receiving the information about the person from the electronic device operating on the installed code including receiving web-browsing activity using the electronic device, and storing the information received from the electronic device into the secure account.

2. The method of claim 1, wherein providing the notice includes providing a notice to websites used by the person to protect the person's protected information in Internet activities, including:
   providing the notice to websites includes providing a cookie file to provide the notice, or providing the notice in a browser header; and
   providing the notice to websites includes providing a notice to websites that the person is asserting ownership over current Internet activity and history of Internet activity.

3. The method of claim 1, wherein acquiring information about the person includes automatically receiving from a financial institution transactional information about purchases by the person.

4. The method of claim 1, further comprising automatically receiving from a financial institution transactional information about purchases by the person, wherein the protected information in the secure account includes the transactional information from the financial institution.

5. The method of claim 1, wherein the abstracted profile code represents demographic information for the person, financial information for the person, or both demographic and financial information for the person.

6. The method of claim 1, wherein providing the notice includes sending an electronic notice to the entities.

7. The method of claim 1, wherein providing the notice includes sending a printed notice to the entities.

8. The method of claim 1, wherein providing the notice includes serving public notice that automatically blanket serves notices on all potential holders, acquirers and users of the protected information.

9. The method of claim 1, wherein providing the notice includes providing the notice to credit reporting agencies.

10. The method of claim 1, wherein providing the notice includes providing the notice to telemarketers.

11. The method of claim 1, wherein providing the notice includes providing a notice to merchants or vendors with whom the person conducts transactions.

12. The method of claim 1, wherein providing the notice includes providing a notice to a company associated with a transaction medium used by the person to purchase goods or services.

13. The method of claim 1, wherein the protected information in the secure account includes personal information pertaining to a use of a wireless device by the person.

14. The method of claim 1, wherein the protected information in the secure account includes personal information pertaining to an IP or other packet addressing scheme used to deliver content to the person.

* * * * *